US012693421B2

(12) United States Patent
Tachwali et al.

(10) Patent No.: US 12,693,421 B2
(45) Date of Patent: Jul. 28, 2026

(54) SYSTEMS AND METHODS FOR CONVOLUTIONAL HIGH RESOLUTION LIDAR IMAGING

(71) Applicant: LG INNOTEK CO., LTD., Seoul (KR)

(72) Inventors: Yahia Tachwali, Princeton, NJ (US); Michael Schoenberg, Seattle, WA (US)

(73) Assignee: LG INNOTEK CO., LTD., Seoul (KR)

( * ) Notice: Subject to any disclaimer, the term of this patent is extended or adjusted under 35 U.S.C. 154(b) by 1002 days.

(21) Appl. No.: 17/823,535

(22) Filed: Aug. 31, 2022

(65) Prior Publication Data

US 2024/0077615 A1     Mar. 7, 2024

(51) Int. Cl.
| | |
|---|---|
| *G01S 17/89* | (2020.01) |
| *G01S 17/931* | (2020.01) |
| *G06K 9/00* | (2022.01) |

(52) U.S. Cl.
CPC ............ *G01S 17/89* (2013.01); *G01S 17/931* (2020.01); *G06F 2218/02* (2023.01)

(58) Field of Classification Search
CPC ........ G01S 7/487; G01S 7/4865; G01S 17/10; G01S 17/931; G01S 13/862; G01S 13/865; G01S 17/86; G01S 7/4802; G01S 17/42; G01S 17/48; B60W 60/001; B60W 2420/408
See application file for complete search history.

(56) References Cited

U.S. PATENT DOCUMENTS

| | | | | |
|---|---|---|---|---|
| 11,017,566 | B1* | 5/2021 | Tourapis | G06T 9/001 |
| 12,037,001 | B1* | 7/2024 | Bacchiani | B60W 40/072 |
| 2018/0259645 | A1* | 9/2018 | Shu | G01S 7/4816 |
| 2019/0056497 | A1* | 2/2019 | Pacala | H10F 39/18 |
| 2021/0165413 | A1* | 6/2021 | Guo | B25J 9/162 |
| 2021/0334538 | A1* | 10/2021 | Marotta | G06Q 10/087 |
| 2022/0024485 | A1* | 1/2022 | Theverapperuma | G06V 20/58 |
| 2022/0113418 | A1* | 4/2022 | Wang | G01S 17/58 |
| 2024/0288555 | A1* | 8/2024 | Lee | G01S 7/4865 |

OTHER PUBLICATIONS

Caulfield, J. et al., Spatial Oversampling in Imaging Sensors: Benefits in Sensitivity and Detection, Argo AI. Downloaded on Sep. 14, 2021 at 22:47:18 UTC from IEEE Xplore.

(Continued)

*Primary Examiner* — Md Saiful A Siddiqui
(74) *Attorney, Agent, or Firm* — Birch, Stewart, Kolasch & Birch, LLP

(57) ABSTRACT

Disclosed herein are systems, methods, and computer program products for operating a lidar system. The methods comprise: performing operations by each of a plurality of photodetectors to facilitate measurements of an intensity of a light signal reflected off an object external to the lidar system; receiving, by a processor, result values from the photodetectors that indicate measured reflected intensities of the light signal; performing, by the processor, at least one convolutional algorithm to combine different sets of the result values to produce a plurality of feature values; and generating, by the processor, at least one depth image or point cloud comprising a plurality of super pixels having values respectively set to the feature values.

20 Claims, 21 Drawing Sheets

(56) References Cited

OTHER PUBLICATIONS

Antonio, R. et al., Real Time Coincidence Processing Algorithm for Geiger-Mode Ladar using FPGAs, 1Massachusetts Institute of Technology—Lincoln Laboratory, Lexington, MA, USA.

Yu, T. et al., Resolution Enhancement Technique Using Range Oversampling, Journal of Atmospheric and Oceanic Technology, vol. 23, p. 228-240, 2006.

Bousi, E. et al., Lateral resolution improvement of oversampled OCT images using Capon estimation of weighted subvolume contribution, Biomedical Optics Express 1319, vol. 8, No. 3 | Mar. 1, 2017.

* cited by examiner $$F_2 = f(p_5, p_6, p_7, p_8)$$

302

Lidar Image 300

$$F_3 = f(p_9, p_{10}, 0, 0), \text{ or}$$
$$f(p_9, p_{10}, p_{10}, p_{10}), \text{ or}$$
$$f(p_9, p_{10}, p_1, p_2)$$

302

Lidar Image 300

Lidar Image 300

302

$F_4 = f(p_{11}, p_{12}, p_{13}, p_{14})$

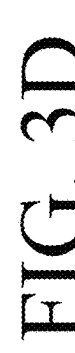

| $p_1$ | $p_2$ | $p_3$ | $p_4$ | $p_5$ | $p_6$ | $p_7$ | $p_8$ | $p_9$ | $p_{10}$ |
| $p_{11}$ | $p_{12}$ | $p_{13}$ | $p_{14}$ | $p_{15}$ | $p_{16}$ | $p_{17}$ | $p_{18}$ | $p_{19}$ | $p_{20}$ |
| $p_{21}$ | $p_{22}$ | $p_{23}$ | $p_{24}$ | $p_{25}$ | $p_{26}$ | $p_{27}$ | $p_{28}$ | $p_{29}$ | $p_{30}$ |
| $p_{31}$ | $p_{32}$ | $p_{33}$ | $p_{34}$ | $p_{35}$ | $p_{36}$ | $p_{37}$ | $p_{38}$ | $p_{39}$ | $p_{40}$ |
| $p_{41}$ | $p_{42}$ | $p_{43}$ | $p_{44}$ | $p_{45}$ | $p_{46}$ | $p_{47}$ | $p_{48}$ | $p_{49}$ | $p_{50}$ |
| $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ |
| $p_{71}$ | $p_{72}$ | $p_{73}$ | $p_{74}$ | $p_{75}$ | $p_{76}$ | $p_{77}$ | $p_{78}$ | $p_{79}$ | $p_{80}$ |
| $p_{81}$ | $p_{82}$ | $p_{83}$ | $p_{84}$ | $p_{85}$ | $p_{86}$ | $p_{87}$ | $p_{88}$ | $p_{89}$ | $p_{90}$ |
| $p_{91}$ | $p_{92}$ | $p_{93}$ | $p_{94}$ | $p_{95}$ | $p_{96}$ | $p_{97}$ | $p_{98}$ | $p_{99}$ | $p_{100}$ |

| | | |
|---|---|---|
| $F_1$ | $F_2$ | $F_3$ |
| $F_4$ | $F_5$ | $F_6$ |
| $F_7$ | $F_8$ | $F_9$ |
| $F_{10}$ | $F_{11}$ | $F_{12}$ |
| $F_{13}$ | $F_{14}$ | $F_{15}$ |
| $F_{16}$ | $F_{17}$ | $F_{18}$ |
| $F_{19}$ | $F_{20}$ | $F_{21}$ |
| $F_{22}$ | $F_{23}$ | $F_{24}$ |
| $F_{25}$ | $F_{26}$ | $F_{27}$ |
| $F_{28}$ | $F_{29}$ | $F_{30}$ |

FIG. 3E

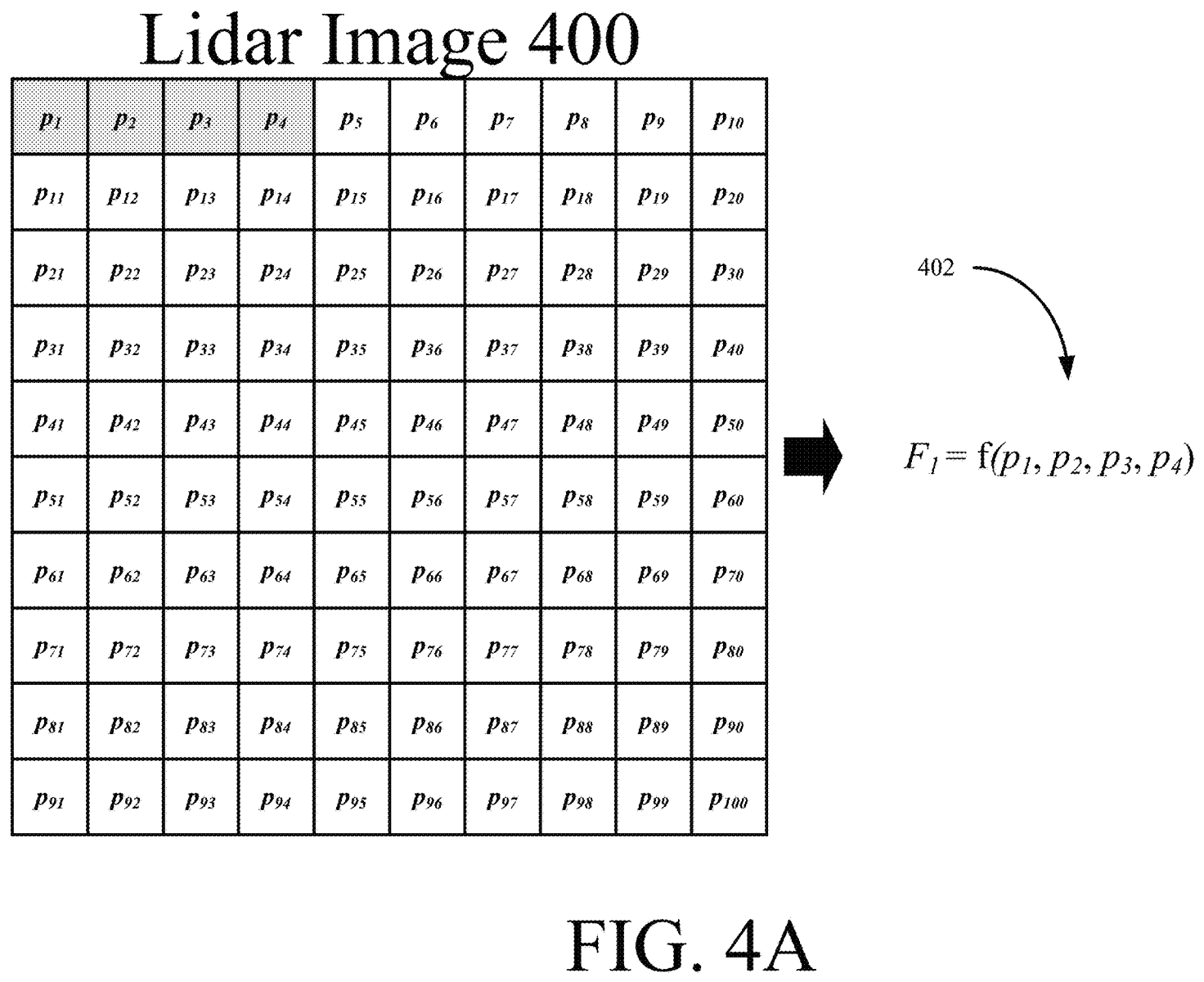

Lidar Image 400

| | | | | | | | | | |
|---|---|---|---|---|---|---|---|---|---|
| $p_1$ | $p_2$ | $p_3$ | $p_4$ | $p_5$ | $p_6$ | $p_7$ | $p_8$ | $p_9$ | $p_{10}$ |
| $p_{11}$ | $p_{12}$ | $p_{13}$ | $p_{14}$ | $p_{15}$ | $p_{16}$ | $p_{17}$ | $p_{18}$ | $p_{19}$ | $p_{20}$ |
| $p_{21}$ | $p_{22}$ | $p_{23}$ | $p_{24}$ | $p_{25}$ | $p_{26}$ | $p_{27}$ | $p_{28}$ | $p_{29}$ | $p_{30}$ |
| $p_{31}$ | $p_{32}$ | $p_{33}$ | $p_{34}$ | $p_{35}$ | $p_{36}$ | $p_{37}$ | $p_{38}$ | $p_{39}$ | $p_{40}$ |
| $p_{41}$ | $p_{42}$ | $p_{43}$ | $p_{44}$ | $p_{45}$ | $p_{46}$ | $p_{47}$ | $p_{48}$ | $p_{49}$ | $p_{50}$ |
| $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ |
| $p_{71}$ | $p_{72}$ | $p_{73}$ | $p_{74}$ | $p_{75}$ | $p_{76}$ | $p_{77}$ | $p_{78}$ | $p_{79}$ | $p_{80}$ |
| $p_{81}$ | $p_{82}$ | $p_{83}$ | $p_{84}$ | $p_{85}$ | $p_{86}$ | $p_{87}$ | $p_{88}$ | $p_{89}$ | $p_{90}$ |
| $p_{91}$ | $p_{92}$ | $p_{93}$ | $p_{94}$ | $p_{95}$ | $p_{96}$ | $p_{97}$ | $p_{98}$ | $p_{99}$ | $p_{100}$ |

402

$$F_1 = \mathrm{f}(p_1, p_2, p_3, p_4)$$

FIG. 4A

Lidar Image 400

| $p_1$ | $p_2$ | $p_3$ | $p_4$ | $p_5$ | $p_6$ | $p_7$ | $p_8$ | $p_9$ | $p_{10}$ |
|---|---|---|---|---|---|---|---|---|---|
| $p_{11}$ | $p_{12}$ | $p_{13}$ | $p_{14}$ | $p_{15}$ | $p_{16}$ | $p_{17}$ | $p_{18}$ | $p_{19}$ | $p_{20}$ |
| $p_{21}$ | $p_{22}$ | $p_{23}$ | $p_{24}$ | $p_{25}$ | $p_{26}$ | $p_{27}$ | $p_{28}$ | $p_{29}$ | $p_{30}$ |
| $p_{31}$ | $p_{32}$ | $p_{33}$ | $p_{34}$ | $p_{35}$ | $p_{36}$ | $p_{37}$ | $p_{38}$ | $p_{39}$ | $p_{40}$ |
| $p_{41}$ | $p_{42}$ | $p_{43}$ | $p_{44}$ | $p_{45}$ | $p_{46}$ | $p_{47}$ | $p_{48}$ | $p_{49}$ | $p_{50}$ |
| $p_{51}$ | $p_{52}$ | $p_{53}$ | $p_{54}$ | $p_{55}$ | $p_{56}$ | $p_{57}$ | $p_{58}$ | $p_{59}$ | $p_{60}$ |
| $p_{61}$ | $p_{62}$ | $p_{63}$ | $p_{64}$ | $p_{65}$ | $p_{66}$ | $p_{67}$ | $p_{68}$ | $p_{69}$ | $p_{70}$ |
| $p_{71}$ | $p_{72}$ | $p_{73}$ | $p_{74}$ | $p_{75}$ | $p_{76}$ | $p_{77}$ | $p_{78}$ | $p_{79}$ | $p_{80}$ |
| $p_{81}$ | $p_{82}$ | $p_{83}$ | $p_{84}$ | $p_{85}$ | $p_{86}$ | $p_{87}$ | $p_{88}$ | $p_{89}$ | $p_{90}$ |
| $p_{91}$ | $p_{92}$ | $p_{93}$ | $p_{94}$ | $p_{95}$ | $p_{96}$ | $p_{97}$ | $p_{98}$ | $p_{99}$ | $p_{100}$ |

402

$$F_2 = \mathrm{f}(p_2, p_3, p_4, p_5)$$

| $F_7$ | $F_{14}$ | $F_{21}$ | $F_{28}$ | $F_{35}$ | $F_{42}$ | $F_{49}$ | $F_{56}$ | $F_{63}$ | $F_{70}$ |
|---|---|---|---|---|---|---|---|---|---|
| $F_6$ | $F_{13}$ | $F_{20}$ | $F_{27}$ | $F_{34}$ | $F_{41}$ | $F_{48}$ | $F_{55}$ | $F_{62}$ | $F_{69}$ |
| $F_5$ | $F_{12}$ | $F_{19}$ | $F_{26}$ | $F_{33}$ | $F_{40}$ | $F_{47}$ | $F_{54}$ | $F_{61}$ | $F_{68}$ |
| $F_4$ | $F_{11}$ | $F_{18}$ | $F_{25}$ | $F_{32}$ | $F_{39}$ | $F_{46}$ | $F_{53}$ | $F_{60}$ | $F_{67}$ |
| $F_3$ | $F_{10}$ | $F_{17}$ | $F_{24}$ | $F_{31}$ | $F_{38}$ | $F_{45}$ | $F_{52}$ | $F_{59}$ | $F_{66}$ |
| $F_2$ | $F_9$ | $F_{16}$ | $F_{23}$ | $F_{30}$ | $F_{37}$ | $F_{44}$ | $F_{51}$ | $F_{58}$ | $F_{65}$ |
| $F_1$ | $F_8$ | $F_{15}$ | $F_{22}$ | $F_{29}$ | $F_{36}$ | $F_{43}$ | $F_{50}$ | $F_{57}$ | $F_{64}$ |

FIG. 4D

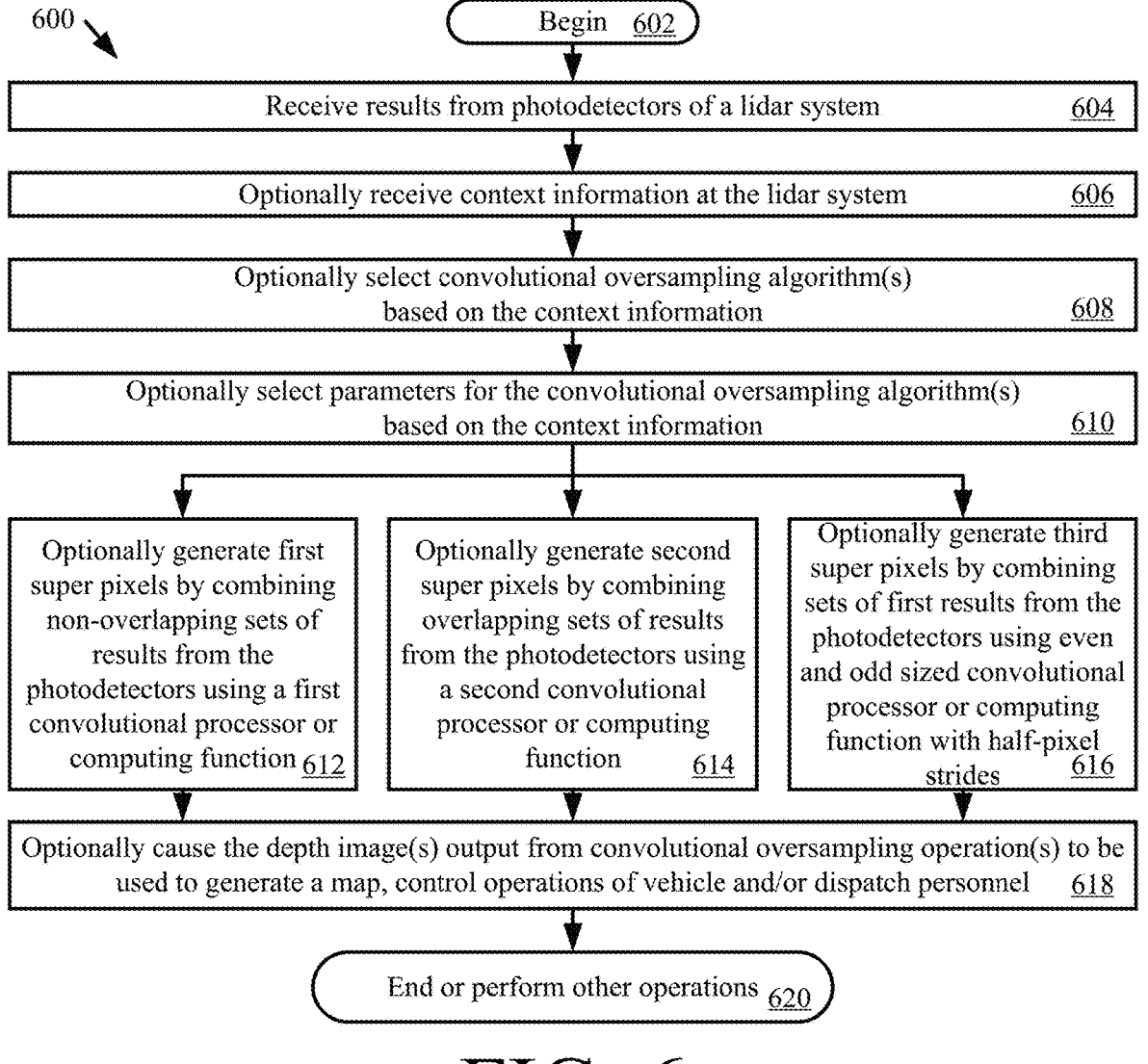

600

Begin   602

Receive results from photodetectors of a lidar system     604

Optionally receive context information at the lidar system     606

Optionally select convolutional oversampling algorithm(s)
based on the context information     608

Optionally select parameters for the convolutional oversampling algorithm(s)
based on the context information     610

Optionally generate first super pixels by combining non-overlapping sets of results from the photodetectors using a first convolutional processor or computing function 612

Optionally generate second super pixels by combining overlapping sets of results from the photodetectors using a second convolutional processor or computing function     614

Optionally generate third super pixels by combining sets of first results from the photodetectors using even and odd sized convolutional processor or computing function with half-pixel strides     616

Optionally cause the depth image(s) output from convolutional oversampling operation(s) to be used to generate a map, control operations of vehicle and/or dispatch personnel     618

End or perform other operations 620

FIG. 6

SYSTEMS AND METHODS FOR CONVOLUTIONAL HIGH RESOLUTION LIDAR IMAGING

BACKGROUND

Light detecting and ranging (lidar) systems are used in various applications. One application for lidar systems is autonomous vehicles (AVs). AVs may use lidar systems to measure the distance from the AV to surrounding objects. To accomplish this task, the lidar system illuminates an object with light and measures the reflected light with a sensor. The reflected light is used to determine features of the object that reflected it and to determine the distance the object is from the AV. Lidar systems also may be used in other applications, such as in aircraft, ships and/or mapping systems.

SUMMARY

The present disclosure concerns implementing systems and methods for operating a lidar system. The methods comprise: performing operations by each of a plurality of photodetectors to facilitate measurements of an intensity of a light signal reflected off an object external to the lidar system; receiving result values from the photodetectors that indicate measured reflected intensities of the light signal; performing at least one convolutional algorithm to combine different sets of the result values to produce a plurality of feature values; and generating at least one depth image or point cloud comprising a plurality of super pixels having values respectively set to the feature values.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

FIGS. 3A-3E (collectively referred to as "FIG. 3") provide illustrations showing another convolutional technique for combining non-overlapping sets of results from photo-detectors of the lidar system shown in FIG. 1.

FIGS. 4A-4D (collectively referred to as "FIG. 4") provide illustrations showing another convolutional technique for combining overlapping sets of results from photodetectors of the lidar system shown in FIG. 1.

FIG. 6 provides a flow diagram of a method for operating a lidar system to produce a depth image from results generated by photodetectors of the lidar system of FIG. 1.

In the drawings, like reference numbers generally indicate identical or similar elements. Additionally, generally, the leftmost digit(s) of a reference number identifies the drawing in which the reference number first appears.

DETAILED DESCRIPTION

Resolution of lidar systems affects its use in certain scenarios. The use of lidar systems is limited by its resolution for detection of road debris, detection of long-range fast movers (for instance, an unprotected left turn with an oncoming speeding motorcycle), and object classification. Such functionality is desirable to AVs especially when camera perception is degraded. Camera perception can be degraded when there is a certain amount of precipitation or during nighttime operation.

For instance, 3D point clouds generated by lidar systems may have limited use for detection of road debris, detection of long-range fast movers (for instance, an unprotected left turn with an oncoming speeding motorcycle), and object classification. Such functionality is desirable to AVs especially when camera perception is degraded. Camera perception can be degraded when there is a certain amount of precipitation or a limited amount of ambient light (for example, during nighttime hours). Thus, the present solution concerns systems and methods that address resolution issues of lidar systems.

For example, the present solution provides a technique to obtain a super-resolution range image using lidar data. The technique involves two operational stages: a convolutional stage and a post processing stage. The convolutional stage is performed to combine results from the photodetectors using overlapping super pixels, in a convolutional fashion. The post processing stage is performed to correct for edge effects caused by operations of the convolutional stage. The particulars of these operations stages will become evident as the discussion progresses.

Figure 1:
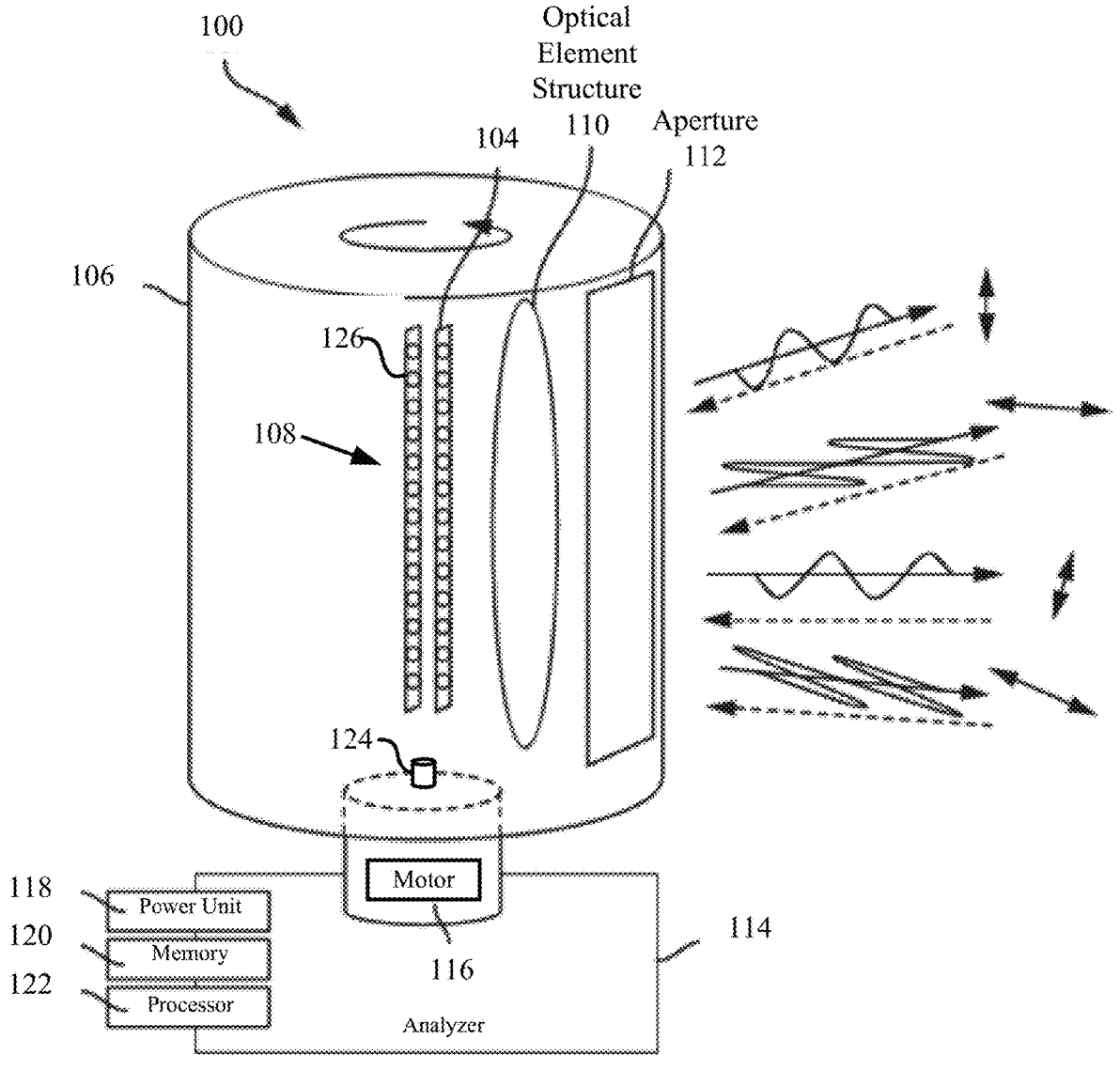
FIG. 1 is an illustration of a lidar system.

FIG. 1 illustrates an architecture for a lidar system 100, in accordance with aspects of the disclosure. Lidar system 100 is merely an example lidar system and that other lidar systems are further contemplated in accordance with aspects of the present disclosure, as should be understood by those of ordinary skill in the art.

As shown in FIG. 1, the lidar system 100 includes a housing 106 which may be rotatable 360° about a central axis such as hub or axle 124 of a motor 116. The housing 106 may include an emitter/receiver aperture 112 made of a material transparent to light. Although a single aperture is shown in FIG. 1, the present solution is not limited in this regard. In other scenarios, multiple apertures for emitting and/or receiving light may be provided. Either way, the lidar system 100 can emit light through one or more of the aperture(s) 112 and receive reflected light back toward one or more of the aperture(s) 112 as the housing 106 rotates around the internal components. In alternative scenarios, the outer shell of housing 106 may be a stationary dome, at least partially made of a material that is transparent to light, with rotatable components inside of the housing 106.

Inside the rotating shell or stationary dome is a light emitter system 104 that is configured and positioned to generate and emit pulses of light through the aperture 112 or through the transparent dome of the housing 106 via one or more laser emitter chips or other light emitting devices. The emitter system 104 may include any number of individual emitters (for example, 8 emitters, 64 emitters, or 128 emitters). The emitters may emit light of substantially the same intensity or of varying intensities. The lidar system 100 also includes a light detector 108 containing an array of photodetectors 126. The photodetectors 126 are positioned and configured to receive light reflected back into the system. Upon receiving reflected light, the photodetectors 126 produce results (or electrical pulses) indicating measured intensities of the light signal reflected off an object external to the lidar system. The light emitter system 104 and light detector 108 rotate with the rotating shell, or they rotate inside the stationary dome of the housing 106. One or more optical element structures 110 may be positioned in front of the light emitting system 104 and/or the light detector 108 to serve as one or more lenses or wave plates that focus and direct light that is passed through the optical element structure 110.

One or more optical element structures 110 may be positioned in front of a mirror (not shown) to focus and direct light that is passed through the optical element structure. As shown in FIG. 1, a single optical element structure 310 is positioned in front of the mirror and connected to the rotating elements of the system so that the optical element structure 110 rotates with the mirror. Alternatively or additionally, the optical element structure 110 may include multiple such structures (for example, lenses and/or waveplates). Optionally, multiple optical element structures 110 may be arranged in an array on or integral with the shell portion of the housing 106.

The lidar system 100 includes a power unit 118 to power the light emitting system 104, motor 116, and electronic components. The lidar system 100 also includes an analyzer 114 with elements such as a processor 122 and non-transitory computer-readable memory 120 containing programming instructions. The programming instructions are configured to enable the system to receive data collected by the light detector 108, analyze the received data to measure characteristics of the light received, and generate information that a connected system can use to make decisions about operating in an environment from which the data was collected. Optionally, the analyzer 114 may be integral with the lidar system 100 as shown, or some or all of it may be external to the lidar system and communicatively connected to the lidar system via a wired or wireless communication network or link.

Under normal operation, a conventional lidar system produces measured 3D points by aggregating raw measurements from the photodetector(s). A single photodetector is not typically sufficient to produce a depth measurement, so instead results from a plurality of photodetectors is combined in non-overlapping super-pixels. In contrast, the present lidar system 100 combines results from the photodetectors 126 using overlapping super pixels, in a convolutional fashion.

Convolutional Stage

Figure 2:
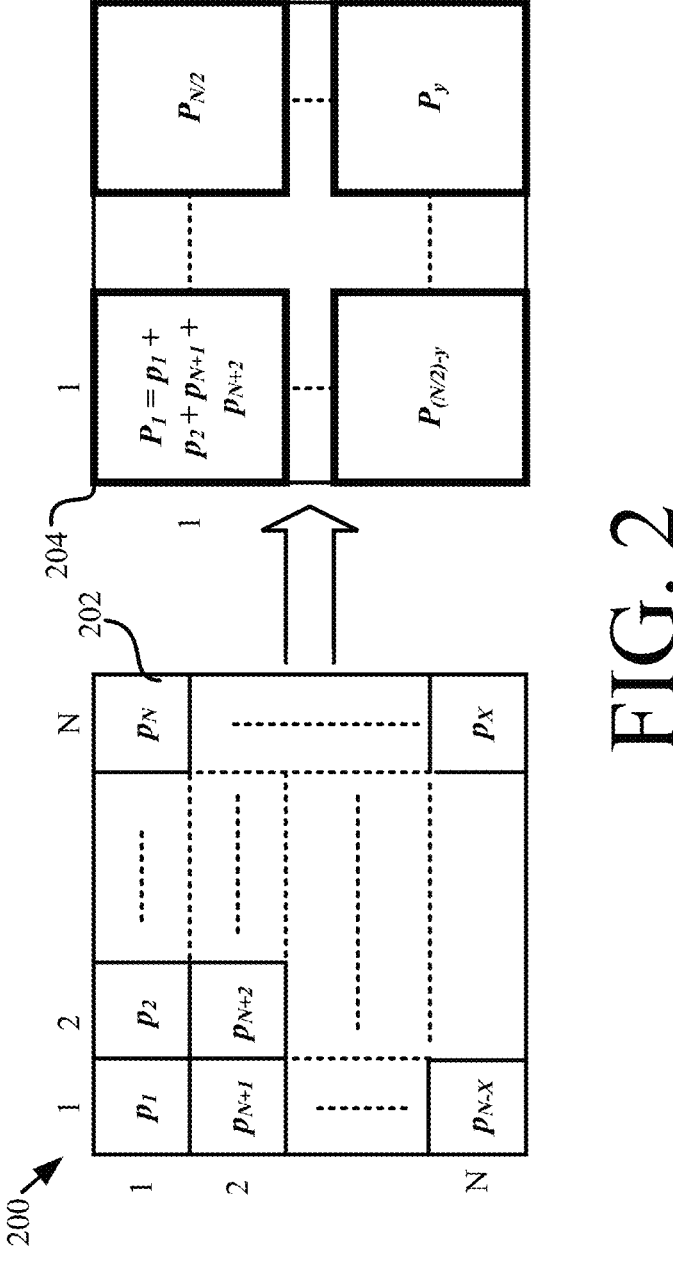
FIG. 2 is an illustration of a convolutional technique for combining results from photodetectors of the lidar system shown in FIG. 1.

For example, with reference to FIG. 2, a photodetector array comprises photodetectors arranged in a grid pattern. Results $p_1$, $p_2$, . . . , $p_x$ from the photodetectors may be represented in grid 200 defined by a plurality of cells, where each cell 202 is associated with a respective one of the photodetectors and x is an integer equal to the total number of photodetectors in the array. The cells 202 of the grid 200 can be arranged in the same pattern as the photodetectors, for example, a 256×256 cell grid pattern. Each result is also referred to herein as a pixel of a lidar image. The pixels $p_1$, $p_2$, . . . , $p_x$ from the photodetectors may be naively aggregated in a super cell-by-super cell manner to produce a set of 3D points. A super cell has a size of W×W, where W is an integer. In FIG. 2, each super cell is 2 cell×2 cells. The 3D point associated with each super cell 204 is derived by combining the respective four pixels with each other to obtain a super pixel $P_1$, $P_2$, . . . , $P_y$. A first super pixel $P_1$ may be defined by the following mathematical equation.

$$P_1 = f(p_1, p_2, p_{N+1}, p_{N+2})$$

The other super pixels $P_2$, . . . , $P_y$ would be defined by a similar mathematical equation as should be understood. This naive aggregation technique produces a lidar image comprising 128×128 super pixels. The mechanism by which the pixels are aggregated is specific to individual lidar system designed and may vary from simple addition as shown in equation (1).

The convolutional approach can be applied in the temporal domain by having interleaved sets of integrated pulses. For example, one hundred pulses may be used to produce: (i) ten 3D point clouds using non-overlapping sets of ten pulses (i.e., the filter (or kernel) size is 1×10 such that 10 pulses of an image are integrated with each other during each computation, the stride is 10 pulses); or (ii) ninety-one 3D point clouds using overlapping sets of ten pulses (i.e., The filter (or kernel) size is 1×10 such that 10 pulses of an image are integrated with each other during each computation, the stride is 1 pulse). An illustration is provided in FIG. 3 that is useful for understanding the convolutional approach (i). An illustration is provided in FIG. 4 that is useful for understanding the convolutional approach (ii). After completion of the convolutional stage, the high-resolution point clouds are then optionally passed through a post processing stage in order to extract the high frequency information by analyzing the variations of point cloud metadata across an up-sampled axis.

Figure 3A:
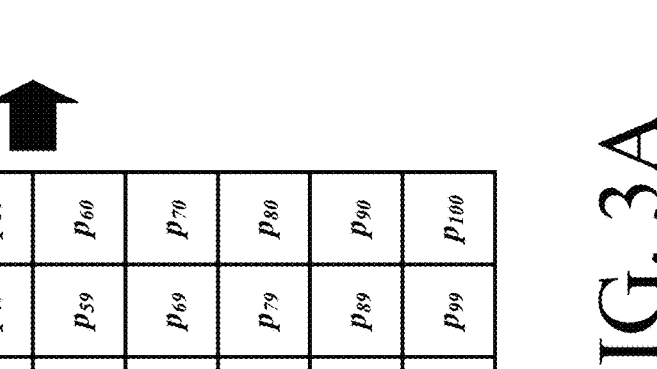
Figure 3B:
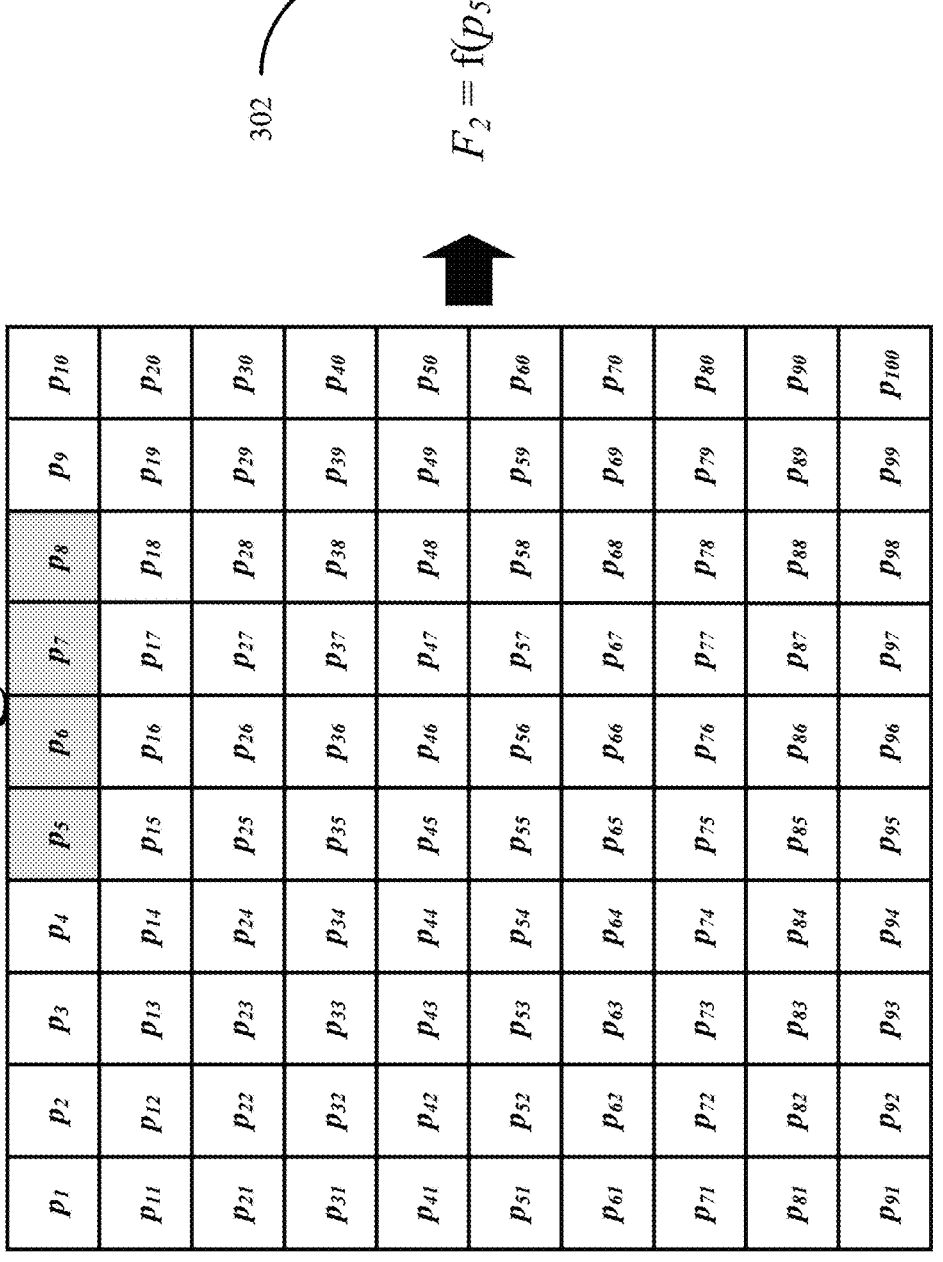
Figure 3C:
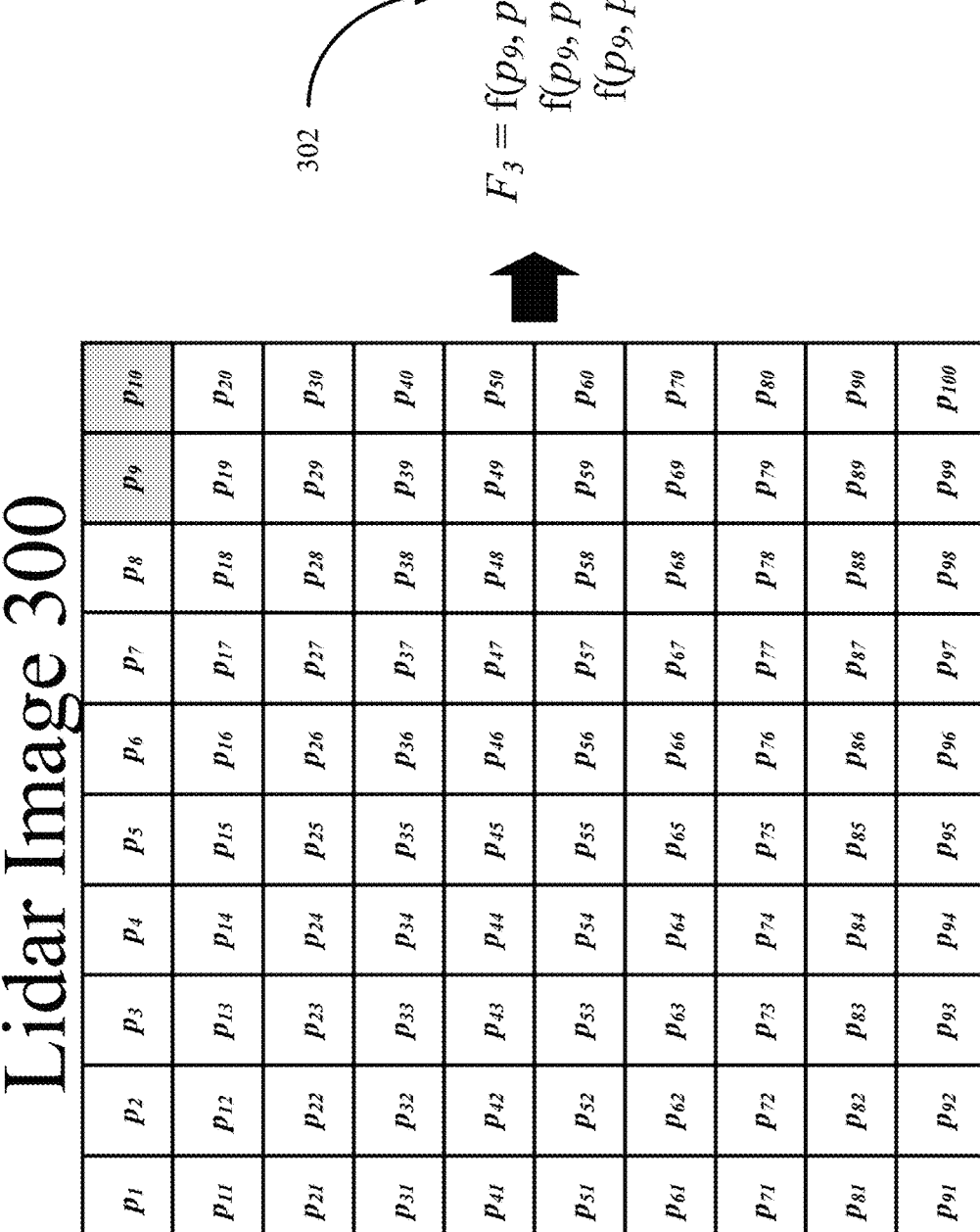

As shown in FIG. 3, one convolutional approach employs at least one processor (or computing kernel) 302 that runs over a lidar image 300 and computes features $F_1$, $F_2$, $F_3$, $F_4$, . . . , $F_{30}$. In the event that multiple computing kernels are employed, each computing kernel extracts a different feature from the lidar image. The computing kernel has a size of 1×4. The image has a size of 10×10. The stride is 4. Thus, the features generated by the computing kernel 302 are defined by the following mathematical equations (1)-(4).

$$F_1 = f(p_1, p_2, p_3, p_4) \tag{1}$$

$$F_2 = f(p_5, p_6, p_7, p_8) \tag{2}$$

$$F_3 = f(p_9, p_{10}, 0, 0) \text{ or } f(p_9, p_{10}, p_{10}, p_{10}) \text{ or } f(p_9, p_{10}, p_1, p_2) \tag{3}$$

$$F_4 = f(p_{11}, p_{12}, p_{13}, p_{14}) \tag{4}$$

. . . .

$F_1$, $F_2$, $F_3$ and $F_4$ represent features generated by the processor (or computing kernel) 302. These features are also referred to herein as super pixels. $p_1$, $p_2$, . . . , $p_{100}$ each represent a result output from a respective photodetector of a lidar system (for example, lidar system 100 of FIG. 1). These results are also referred to as pixels of a lidar image. As evidenced by mathematical equations (1)-(4), the convolutional operations generally comprise combining pixel values to generate a super pixel. The outputs of the processor (or computing kernel) 302 are arranged in a grid 304 of features (or super pixels) as shown in FIG. 3E. Grid 304 is also referred to herein as a depth image. The present solution is not limited to the particulars of FIG. 3. Other convolutional techniques can be employed.

It should be noted that the processor (or computing kernel) 302 may implement padding, border extension or mirroring when computing a super pixel with the last two results of each row (i.e., $p_9$ and $p_{10}$, $p_{19}$ and $p_{20}$, $p_{29}$ and $p_{30}$, . . . ). This is because the processor (or computing kernel) 302 has a size of 1×4 and each row has ten values. Since a remainder of two exists when ten is divided by four, the last convolution operation of each row only has two inputs rather than four inputs. Two zeros are used for the other two required inputs for the processor (or computing kernel) 302 as shown by mathematical equation (3). Other techniques can be employed other than padding with zeros. For example, the last two values of each row can be repeated to produce the required four inputs for the processor (or computing kernel) (i.e., for the last computation of the first row, the input to the processor (or computing kernel) 302 comprises $p_9$, $p_{10}$, $p_9$, $p_{10}$). Alternatively, the photodetectors can be skipped such that results output therefrom are not input into the processor(s) (or computing kernel(s)) for generating super pixels. The present solution is not limited to the particulars of these examples.

Figure 4C:
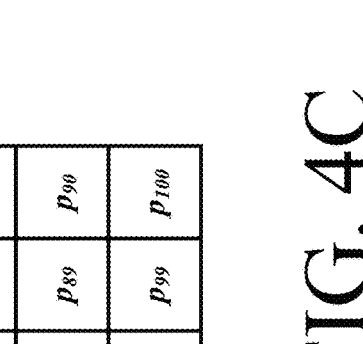

As noted above, another convolutional technique is shown in FIG. 4. This convolutional approach employs at least one processor (or computing kernel) 402 that runs over a lidar image 400 and computes features $F_1$, $F_2$, $F_3$, $F_4$, . . . , $F_{70}$. In the event that multiple processors (or computing kernels) are employed, each processor (or computing kernel) extracts a different feature from the lidar image. The processor (or computing kernel) has a size of 1×4. The image has a size of 10×10. The stride is 1. Thus, the features generated by the processor (or computing kernel) 402 are defined by the following mathematical equations (5)-(7).

$$F_1 = f(p_1, p_2, p_3, p_4) \tag{5}$$

$$F_2 = f(p_2, p_3, p_4, p_5) \tag{6}$$

$$F_3 = f(p_3, p_4, p_5, p_6) \tag{7}$$

. . . .

$F_1$, $F_2$ and $F_3$ represent features generated by the processor (or computing kernel) 402. These features are also referred to herein as super pixels. $p_1$, $p_2$, . . . , $p_{100}$ each represent a result output from a respective photodetector of a lidar system (for example, lidar system 100 of FIG. 1). These results are also referred to as pixels of a lidar image. As evidenced by mathematical equations (5)-(7), the convolutional operations generally comprise combining pixel values to generate a super pixel. The outputs of the processor (or computing kernel) 402 are arranged in a grid 404 of features (or super pixels) as shown in FIG. 4D. The grid 404 is larger than grid 404 of FIG. 4E, and therefore the output of processor (or computing kernel) 402 is considered as having a higher resolution as compared to the output of processor (or computing kernel) 402. Grid 404 is also referred to herein as a depth image. The present solution is not limited to the particulars of FIG. 4.

The above convolutional techniques are spatially sound in the lidar context. In this regard, it should be understood that each photodetector corresponds to a frustum (with the base attached to the photodetector optics) whereby the received photons come from a subset of the region in the world that the frustum intersects. Thus, when using a convolutional approach, the regions that each point describes in physical space overlap with the regions described by that point's neighbors. However, even though this is true, it is trivial to avoid overlap if needed by subsampling the higher resolution back to the original resolution. In some sense, the present approach may produce a second, interleaved depth result at half the point step of the original depth map when the original depth map is 2×2 super pixels. When the original depth map is 3×3 super pixels, the present approach can produce an interleaved depth results at ⅓ the point step of the original depth map. An analogy is moving a camera by half of its pixel pitch to take a second photo. So that is to say, the extra depth points are "real". They add real high frequency information to the result even though their region of support is the same size as the original recovery method.

The convolutional approach of the present solution may be generalized. One significant example is running even/odd sized aggregation kernels over the lidar photodetector array to produce depth points interleaved at half-pixel strides. As an example, a lidar system is configured to naively use a 3×3 photodetector array to produce one 3D point. A 3×3 array may be convolved to produce 3D points whose frustra are centered at the photodetector coordinates, or a 2×2 subarray may be convolved over the same photodetectors to produce 3D points whose frustra are centered precisely between the photodetectors, or both simultaneously. It is of course possible to perform this convolution operation on only one axis of the sensor, even if it is a multi-axis sensor, as this operation may be implemented by software executed by a processor.

Post Processing Stage

The convolutional method introduces edge effects which can be measured reflected intensity dependent. In other words, depending on the reflectivity of the target object (for example, a vehicle, cyclist, etc.) different edge effects can be observed as shown in FIG. 5.

Figure 5:
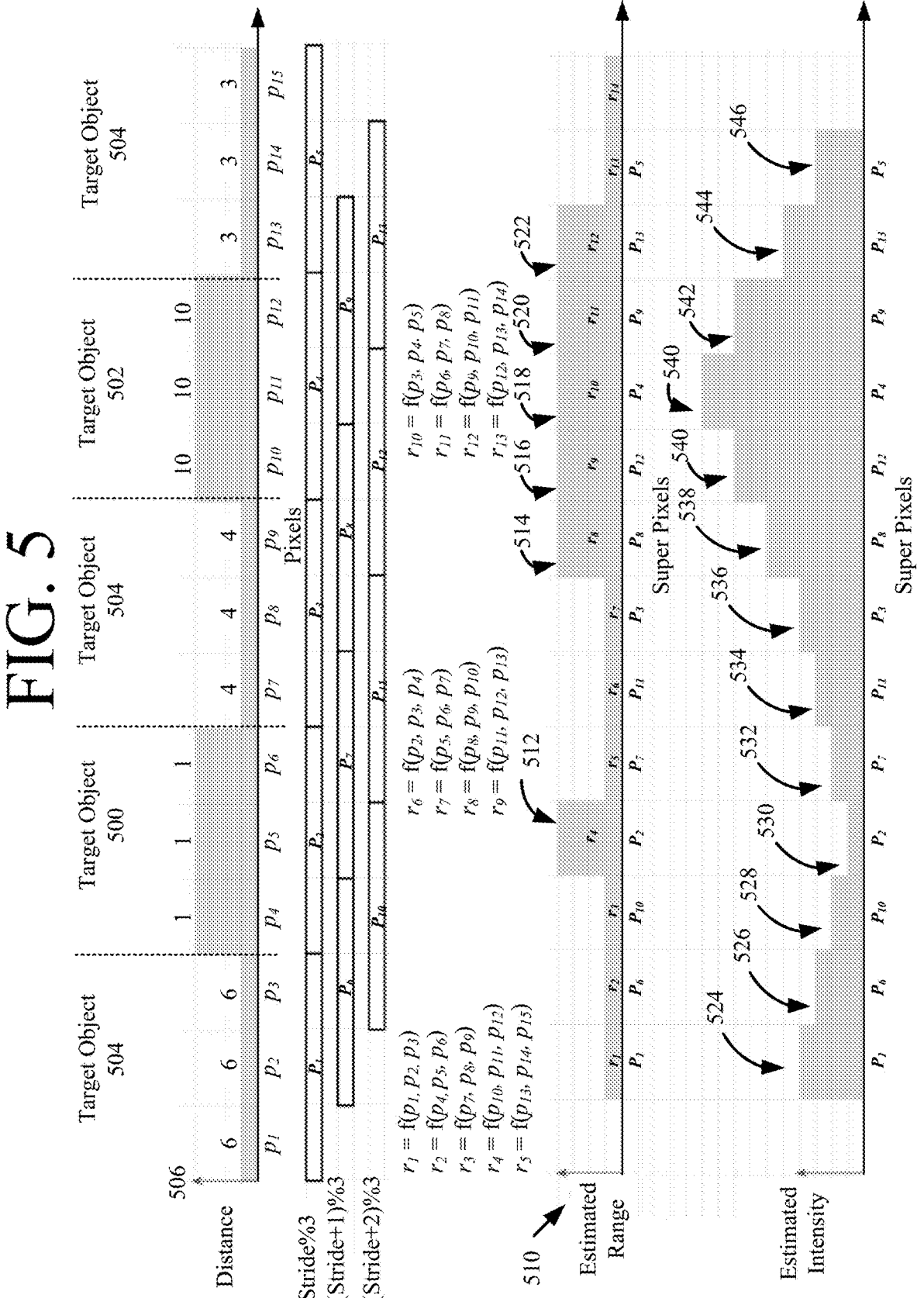
FIG. 5 provides an illustration that is useful for understanding edge effects caused by operations of the convolutional techniques of FIGS. 3-4.

FIG. 5 depicts a hypothetical scenario to demonstrate the edge effects caused by the direct application of convolutional technique. In this scenario, target objects 500, 502, 504 have different measured reflected intensities. Target object 500 is at a far distance and has a measured reflected intensity 1. Target object 502 is at far distance and has a measured reflected intensity 10, while target objects 504 are at close distanced and have measured reflected intensities 6, 4 and 3. The top graph shows measured intensity values for a plurality of pixels $p_1$, $p_2$, . . . , $p_{15}$ of a lidar image. The x-axis 506 of the top graph is any integration axis (for example, elevation) at which three pixels are integrated to form a 3D point $r_1$, $r_2$, . . . , $r_{13}$. The 3D points are defined by the following mathematical equations.

$$r_1 = f(p_1, p_2, p_3) \quad r_6 = f(p_2, p_3, p_4) \quad r_{11} = f(p_6, p_7, p_8)$$

$$r_2 = f(p_4, p_5, p_6) \quad r_7 = f(p_5, p_6, p_7) \quad r_{12} = f(p_9, p_{10}, p_{11})$$

$$r_3 = f(p_7, p_8, p_9) \quad r_8 = f(p_8, p_9, p_{10}) \quad r_{13} = f(p_{12}, p_{13}, p_{14})$$

$$r_4 = f(p_{10}, p_{11}, p_{12}) \quad r_9 = f(p_{11}, p_{12}, p_{13})$$

$$r_5 = f(p_1, p_2, p_3) \quad r_{10} = f(p_3, p_4, p_5)$$

$$i_1 = g(p_1, p_2, p_3)$$

$$\ldots$$

$$i_{13} = g(p_{12}, p_{13}, p_{14})$$

where f is the function that estimates the range and g is the function that estimates intensity.

The estimated range and intensity values are shown in the bottom two graphs of FIG. 5 as a result of the three-pixel groupings. The range for the target object 500 (with measured reflected intensity 1) was not detected by the lidar system until all three pixels in a given group (i.e., group $\{p_4, p_5, p_6\}$) occupy the target object (as shown by portion 512 of graph 510 associated with super pixel $P_2$), while for target object 502 (with measured reflected intensity 10) the range was detected therefore when a single pixel out of the three pixels in a given group (i.e., group $\{p_8, p_9, p_{10}\}$, group $\{p_9, p_{10}, p_{11}\}$, group $\{p_{10}, p_{11}, p_{12}\}$, group $\{p_{11}, p_{12}, p_{13}\}$, or group $\{p_{12}, p_{13}, p_{14}\}$) overlaps the target object (as shown by portions 514, 516, 518, 520, 522) of graph 510 associated with super pixels $P_8, P_{12}, P_4, P_9, P_{13}$). This is the edge effect. Bright targets appear slightly bigger while dark objects appear smaller (or sometimes can't be sensed) as a result of the integration of multiple pixels in which not all of them occupy the target object itself.

The correction of the edge effect on the resulting depth image can be done in two stages: a dilation stage; and an erosion stage. The dilation stage involves dilating super pixel values with corresponding low estimated intensity values and/or low reflectivity (for example, super pixels with adjacent pixels at different range and higher intensity and/or reflectivity values $P_6, P_{10}, P_2, P_7, P_{11}$ of FIG. 5 which are associated with estimated intensity values 526, 528, 530, 532, 534 and which are associated with the measured reflected intensity of 1). The dilation can be achieved by: comparing the difference in estimated intensity values (for example, estimated intensity values 524, . . . , 546 of FIG. 5) to a threshold value (for example, 3); identifying super pixels based on the comparing (for example, super pixels that are associated with the estimated intensity values at the low side of intensity difference); and performing dilation operations using dilation kernel size that is equivalent to the super pixel size. The present solution is not limited to this particular technique for dilating super pixel values. Other techniques can be alternatively used.

The erosion stage involves removing edge dilation of bright objects. This is achieved by: comparing the difference in estimated intensity values at edges where there is relatively large change in distance values (for example, estimated intensity values 528, 530, 532, 536, 538, 544, 546 of FIG. 5) to a threshold value (for example, 9); identifying super pixels based on the comparing (for example, super pixels that are associated with the estimated intensity values at the high side of intensity difference); detecting an availability of a second return from the photodetectors for any pixel associated with each identified super pixel; and either (a) decreasing a confidence value associated with each super pixel generated using a pixel value with an available second return, (b) discarding each super pixel which was generated using a pixel value with an available second return, or (c) swapping the first measured reflectivity value of the first return with the second measured reflectivity value of the second return for a respective pixel of the lidar image and re-computing the super pixel value using the second measured reflectivity value.

The post processing stage can also leverage the difference in spatial response among different lidar metadata. The above example is proposing the use of estimated intensity variations to correct for depth image edge effects. Other variations that could be leveraged are range-invariant metrics such as pixel noise level and spatial statistical metrics.

FIG. 6 provides a flow diagram of an illustrative method 600 for operating a lidar system (for example, lidar system 100 of FIG. 1). Method 600 can be entirely or partially performed by a computing device (for example, analyzer 114 of FIG. 1 and/or processor 122 of FIG. 1) of the lidar system and/or a computer system external to and/or remote from the lidar system (for example, a vehicle's on-board computing device).

Method 600 begins with 602 and continues with 604 where the computing device receives results (for example, results $p_1, \ldots, p_x$ of FIG. 2, $p_1, \ldots, p_{100}$ of FIGS. 3-4, or $p_1, \ldots, p_{15}$ of FIG. 5) from photodetectors (for example, photodetectors 126 of FIG. 1) of the lidar system. The results indicate the measured reflected intensities of a light signal. The computing device then performs operations to generate one or more sets of super pixels (for example, super pixels $F_1, \ldots, F_{30}$ of FIG. 3, $F_1, \ldots, F_{70}$ of FIG. 4, or $P_1, \ldots, P_{13}$ of FIG. 5) using the results received from the photodetectors. Each set of super pixels is generated in accordance with a respective one of a plurality of convolutional techniques.

In some scenarios, the convolutional algorithm(s) and/or parameters thereof are pre-selected and do not change over time. However, in other scenarios, the convolutional algorithm(s) and/or parameters thereof are dynamically selected and/or selectively changed during use of the lidar system. In this latter case, the lidar system can additionally receive context information as shown by optional block 606. The context information can include, but is not limited to, time of day, amount of ambient light, amount of fog, degree of visibility, information indicating whether the lidar system is being used by a vehicle located in a densely populated area, information indicating whether the lidar system is being used by a vehicle traveling on a road in a city, whether the lidar system is being used by a vehicle traveling on a highway, sensor data, and/or any other information specifying characteristics or conditions of an environment in which the lidar systems is currently being used. The sensor data can be generated by sensors external to and/or remote from the lidar system (for example, any sensor such as a light sensor, an accelerometer and/or a location sensor of a vehicle to which the lidar system is mounted). The characteristics or conditions of the environment can include, but are not limited to, a temperature, a humidity, an ambient light, fog, smoke, a building density, and/or a population size.

The context information can optionally be used in 608 to select one or more convolutional algorithm(s) from a plurality of convolutional algorithm(s). For example, a first convolutional algorithm is selected when the context information indicates a vehicle is traveling in the city. In contrast, a second different convolutional algorithm is selected when the context information indicates a vehicle is traveling on the highway. The first convolutional algorithm is configured to produce a first depth image with a resolution lower than the resolution of a second depth image that the second different convolutional algorithm is configured to produce. The computational processing required to generate the first depth image is less than required to generate the second depth image. Thus, the selection of convolutional algorithm(s) is a compromise between image resolution and processing resource intensity.

The context information may alternatively or additionally be used to select parameters for the convolutional algorithm(s) that is(are) to be used by the lidar system to generate depth image(s). The parameters can include, but are not limited to, a filter (or kernel) size and/or a stride. For example, a first kernel size and/or stride is selected when the context information indicates the lidar system is being used in a city. In contrast, a second different kernel size and/or stride is selected when the context information indicates that the lidar system is being used outside of the city. The first kernel size is larger than the second different kernel size, and the first stride is larger than the second different stride. The present solution is not limited to the particulars of this example.

The plurality of convolutional techniques can include, but are not limited to, those referenced in blocks 612-616. Each of the convolutional techniques can be performed using values for one or more axis (i.e., x-axis values, y-axis values and/or z-axis values).

In block 612, first super pixels are generated by combining non-overlapping sets of the results from the photodetectors using a first convolutional processor or computing function (for example, processor or computing kernel 302 of FIG. 3). In block 614, second super pixels are generated by combining overlapping sets of the results from the photodetectors using a second convolutional processor or computing function (for example, processor or computing kernel 402 of FIG. 4). In block 616, third super pixels are generated by combining overlapping sets of the results from the photodetectors using even and odd sized convolutional processors or computing functions at half pixel strides. The output of each convolutional operation is referred to as a depth image. The depth image comprises a plurality of super pixels, where each super pixel has a depth value associated therewith. The depth value can comprise a feature value generated by a convolutional algorithm. The resolution of the depth image is higher than the resolution of the lidar image defined by results of the photodetectors. When two or more of the convolutional algorithm(s) are to be employed, the operations of the respective blocks 612, 614, 616 can be performed in series (not shown in FIG. 6) or in parallel (as shown in FIG. 6).

Upon completing 612, 614 and/or 616, the lidar system optionally performs operations to cause the depth image(s) to be used for one or more purposes by an external device. For example, the depth image(s) can be used by a computer system to generate a map, control operations of a vehicle and/or dispatch personnel to a particular geographic location. The present solution is not limited to the particulars of this example. Subsequently, method 600 ends or other operations are performed (for example, return to 604 or correct edge effects in the depth images).

Figure 7:
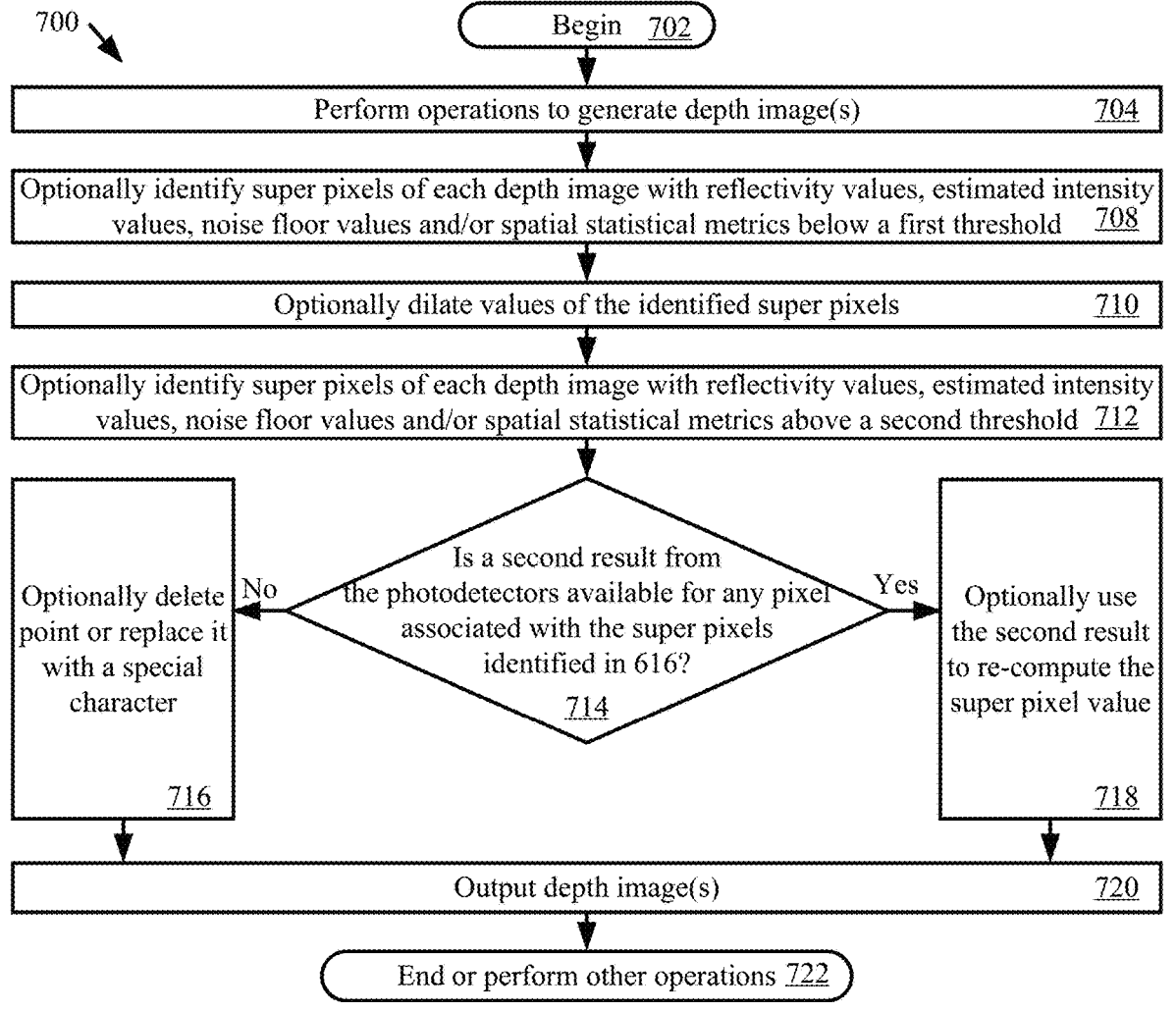
FIG. 7 provides a flow diagram of another method for operating a lidar system to produce a depth image from results generated by photodetectors of the lidar system of FIG. 1.

As noted above, the depth images can have edge effects that may need to be corrected. Thus, method 600 may be modified to include additional blocks for achieving edge effect corrections. FIG. 7 shows a method 700 for generating depth images and correcting edge effects thereof.

As shown in FIG. 7, method 700 begins with 702 and continues with 704 where one or more depth image(s) is(are) generated by a lidar system (for example, lidar system 100 of FIG. 1). The depth image(s) can be generated in the same or similar manner as that discussed above in relation to blocks 604-616 of FIG. 6.

The edge effect of the depth image(s) can be corrected in accordance with operations of blocks 708-710 and/or in accordance with operations of blocks 712-716. Blocks 708-710 involve: identifying super pixels from each depth image with associated measured reflectivity values, estimated intensity values, noise floor values and/or spatial statistical metrics below a first threshold value (for example, 3); and dilating or otherwise increasing the value(s) of the super pixel(s) which was(were) identified.

The super pixel values may be dilated or increased using a convolutional filter (or kernel) with a size that is inversely proportional to the respective estimated intensity value when all estimated intensity values within the filter (or kernel) are below the threshold value. The threshold value may be pre-defined or dynamically selected based on context information. The threshold value can have any value selected in accordance with a given application. In some scenarios, the threshold value is an integer between zero and one hundred. For example, the threshold value may be more than, equal to or less than 30% for reflectivity. The present solution is not limited in this regard. This context information may be the same as or similar to the context information described above in relation to block 606 of FIG. 6. For example, a first threshold value is selected from a plurality of threshold values based on the time of day and/or the geographic location in which the lidar system is being used. A first threshold value is selected when the lidar system is being used in the daytime and/or city, and a second different threshold value is selected when the lidar system is being used at nighttime and/or in a rural area. The present solution is not limited in this regard.

Blocks 712-714 involve: identifying super pixels of each depth image with reflectivity values, estimated intensity values, noise floor values and/or spatial statistical metrics above a second threshold value; and detecting whether a second result from the photodetectors is available for any pixel associated with the identified super pixels. The second threshold value may be pre-defined or dynamically selected based on context information. The second threshold value can have any value selected in accordance with a given application. In some scenarios, the second threshold value is an integer between zero and one hundred. For example, the threshold value may be more than, equal to or less than 30% for reflectivity. The present solution is not limited in this regard.

If a second result is not available [714:NO], then method 700 continues with 716. If there is no second return above a detection threshold, then the point is deleted or replaced with a special character to indicate that there is no range measurement at that particular super pixel. If the second result is available [714:YES], then method 700 continues with 718 where: a first measured reflectivity value of a first return is swapped with a second measured reflectivity value of a second return for the super pixel; a new feature value is computed using the second measured reflectivity value; and the super pixel value is replaced with the new feature value provided that falls within a pre-defined range (otherwise the super pixel is discarded).

Upon completing 716 or 718, the depth image(s) is(are) output as shown by 718. Subsequently, 720 is performed where method 700 ends or other operations are performed (for example, the operations discussed above in relation to 618 of FIG. 6).

The above described lidar system can be used in various applications. The present solution will now be described in the context of autonomous vehicles. However, the present solution is not limited to autonomous vehicle applications. The present solution can be used in other applications such as robotic applications (for example to control movements of articulating arms) and/or system performance applications.

Figure 8:
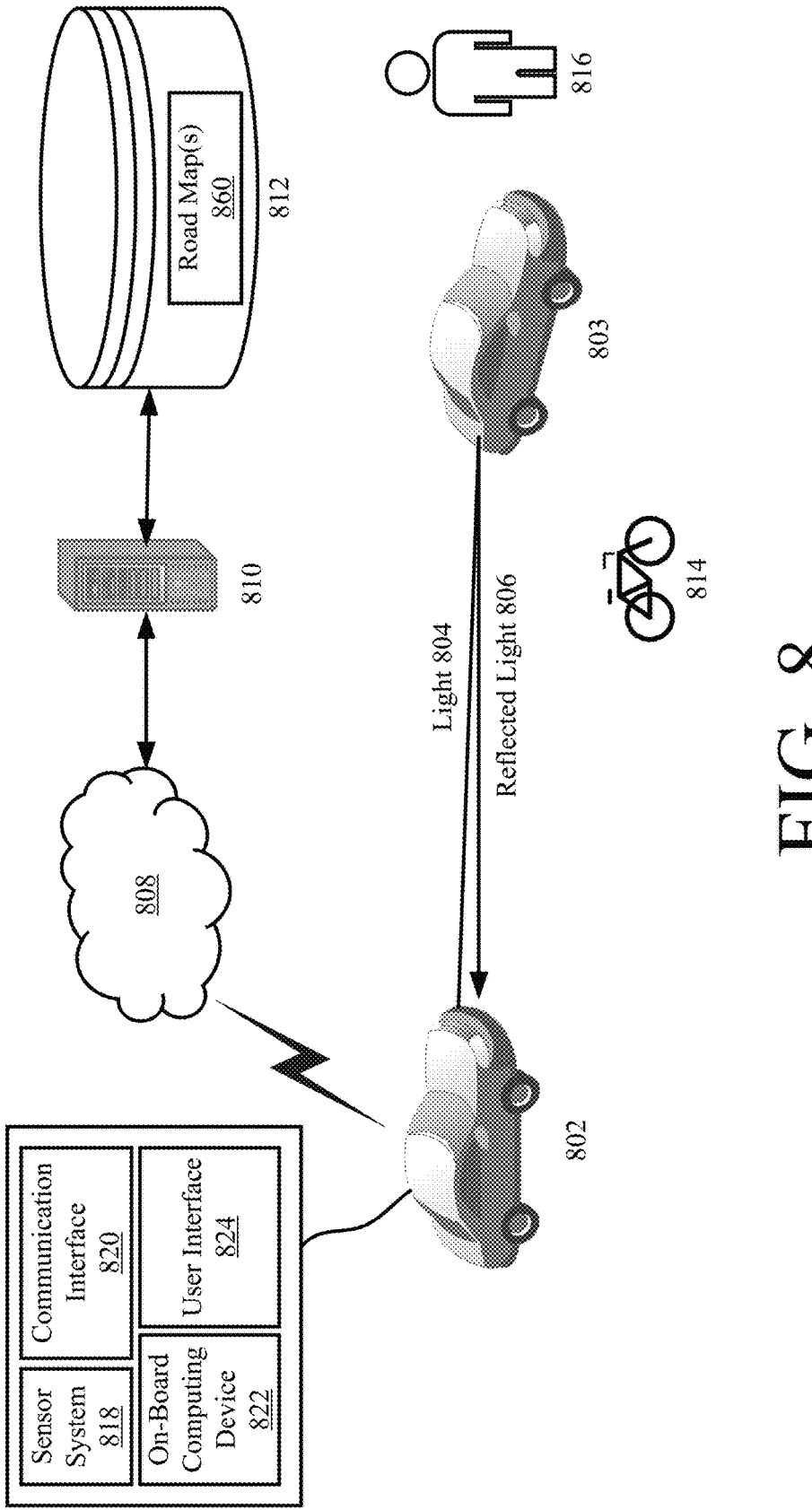
FIG. 8 provides an illustration of a system.

FIG. 8 illustrates an example system 800, in accordance with aspects of the disclosure. System 800 comprises a vehicle 802 which is caused to travel along a road in a semi-autonomous or autonomous manner. Vehicle 802 is also referred to herein as an AV 802. The AV 802 can include, but is not limited to, land vehicles (as shown in FIG. 8), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 802 is generally configured to detect objects 803, 814, 816 in proximity thereto. The objects can include, but are not limited to, a vehicle 803, a cyclist 814 (such as a rider of a bicycle, electric scooter, motorcycle, or the like) and/or a pedestrian 816.

As illustrated in FIG. 8, the AV 802 may include a sensor system 818, an on-board computing device 822, a communications interface 820, and a user interface 824. AV 802 may further include certain components (as illustrated, for example, in FIG. 8) included in vehicles, which may be controlled by the on-board computing device 822 using a variety of communication signals and/or commands, such as, for example, acceleration signals or commands, deceleration signals or commands, steering signals or commands, braking signals or commands, etc.

The sensor system 818 may include one or more sensors that are coupled to and/or are included within the AV 802, as illustrated in FIG. 8. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), wheel speed sensors, etc.), humidity sensors, occupancy sensors, and/or the like. The sensors are generally configured to generate sensor data. The sensor data can include information that describes the location of objects within the surrounding environment of the AV 802, information about the environment itself, information about the motion of the AV 802, information about a route of the vehicle, and/or the like. As AV 802 travels over a surface (for example, a road), at least some of the sensors may collect data pertaining to the surface.

As will be described in greater detail, AV 802 may be configured with a lidar system (for example, lidar system 100 of FIG. 1). The lidar system may be configured to transmit a light pulse 804 to detect objects located within a distance or range of distances of AV 802. Light pulse 804 may be incident on one or more objects (for example, AV 803) and be reflected back to the lidar system. Reflected light pulse 806 incident on the lidar system may be processed to determine a distance of that object to AV 802. The reflected light pulse 806 may be detected using, in some scenarios, a photodetector or array of photodetectors positioned and configured to receive the light reflected back into the lidar system. Lidar information, such as detected object data, is communicated from the lidar system to the on-board computing device 822. The AV 802 may also communicate lidar data to a remote computing device 810 (for example, a cloud processing system) over a network 808. Computing device 810 may be configured with one or more servers to process one or more processes of the technology described herein. Computing device 810 may also be configured to communicate data/instructions to/from AV 802 over network 808, to/from server(s) and/or database(s) 812.

It should be noted that the lidar systems for collecting data pertaining to the surface may be included in systems other than the AV 802 such as, without limitation, other vehicles (autonomous or driven), robots, satellites, etc.

Network 808 may include one or more wired or wireless networks. For example, the network 808 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 802 may retrieve, receive, display, and edit information generated from a local application or delivered via network 808 from the database 812. Database 812 may be configured to store and supply raw data, indexed data, structured data, map data, program instructions or other configurations as is known.

The communications interface 820 may be configured to allow communication between AV 802 and external systems, such as, for example, external devices, sensors, other vehicles, servers, data stores, databases, etc. The communications interface 820 may utilize any now or hereafter known protocols, protection schemes, encodings, formats, packaging, etc. such as, without limitation, Wi-Fi, an infrared link, Bluetooth, etc. The user interface 824 may be part of peripheral devices implemented within the AV 802 including, for example, a keyboard, a touch screen display device, a microphone, and a speaker, etc. The vehicle also may receive state information, descriptive information or other information about devices or objects in its environment via the communication interface 820 over communication links such as those known as vehicle-to-vehicle, vehicle-to-object or other V2X communication links. The term "V2X" refers to a communication between a vehicle and any object that the vehicle may encounter or affect in its environment.

As noted above, the AV 802 may detect objects 803, 814, 816 in proximity thereto. Such object detections are facilitated using the sensor data generated by the sensor system 818 (for example, lidar datasets generated by an onboard lidar detector). The sensor data is processed by the onboard computing device 822 of the AV 802 and/or by the remote computing device 810 to obtain one or more predicted trajectories for the object given the sensor data. The predicted trajectories for the object may then be used to generate a trajectory for the AV 802. The AV 803 may then be caused by the on-board computing device to follow the trajectory.

Figure 9:
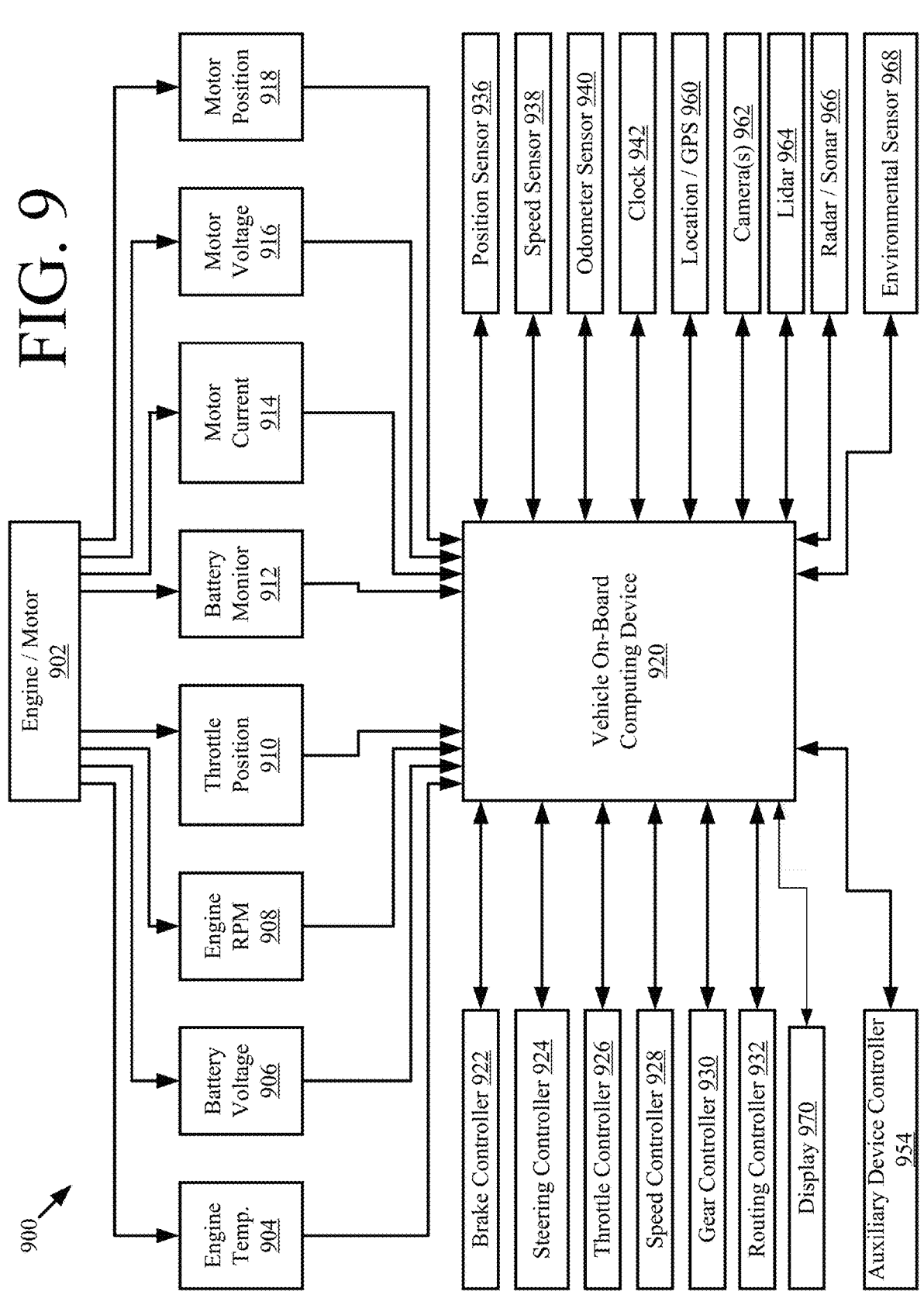
FIG. 9 provides a more detailed illustration of an autonomous vehicle.

FIG. 9 illustrates a system architecture 900 for a vehicle, in accordance with aspects of the disclosure. Vehicles 802 and/or 803 of FIG. 8 can have the same or similar system architecture as that shown in FIG. 9. Thus, the following discussion of system architecture 900 is sufficient for understanding vehicle(s) 802, 803 of FIG. 8. However, other types of vehicles are considered within the scope of the technology described herein and may contain more or less elements as described in association with FIG. 9. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 9, the system architecture 900 includes an engine or motor 902 and various sensors 904-918 for measuring various parameters of the vehicle. In gas-powered or hybrid vehicles having a fuel-powered engine, the sensors may include, for example, an engine temperature sensor 904, a battery voltage sensor 906, an engine Revolutions Per Minute (RPM) sensor 908, and a throttle position sensor 910. If the vehicle is an electric or hybrid vehicle, then the vehicle may have an electric motor, and accordingly will have sensors such as a battery monitoring system 912 (to measure current, voltage and/or temperature of the battery), motor current 914 and voltage 916 sensors, and motor position sensors 918 such as resolvers and encoders 918.

Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device 920, it may be a separate device, or multiple clocks may be available.

The vehicle also will include various sensors that operate to gather information about the environment in which the vehicle is traveling. These sensors may include, for example: a location sensor 960 (for example, a GPS device); object detection sensors such as one or more cameras 962; a lidar sensor system 964; and/or a RADAR and/or SONAR system 966. The sensors also may include environmental sensors 968 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 920. The vehicle on-board computing device 920 may be implemented using the computer system of FIG. 10. The vehicle on-board computing device 920 analyzes the data captured by the sensors and optionally controls operations of the vehicle based on results of the analysis. For example, the vehicle on-board computing device 920 may control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. Auxiliary device controller 954 may be configured to control one or more auxiliary devices, such as testing systems, auxiliary sensors, mobile devices transported by the vehicle, etc.

Geographic location information may be communicated from the location sensor 960 to the vehicle on-board computing device 920, which may then access a map of the environment that corresponds to the location information to determine known fixed features of the environment such as streets, buildings, stop signs and/or stop/go signals. Captured images from the cameras 962 and/or object detection information captured from sensors such as lidar system 964 is communicated from those sensors to the vehicle on-board computing device 920. The object detection information and/or captured images are processed by the vehicle on-board computing device 920 to detect objects in proximity to the vehicle. Any known or to be known technique for making an object detection based on sensor data and/or captured images can be used in the embodiments disclosed in this document.

Lidar information is communicated from lidar system 964 to the vehicle on-board computing device 920. Additionally, captured images are communicated from the camera(s) 962 to the vehicle on-board computing device 920. The lidar information and/or captured images are processed by the vehicle on-board computing device 920 to detect objects in proximity to the vehicle. The manner in which the object detections are made by the vehicle on-board computing device 920 includes such capabilities detailed in this disclosure.

In addition, the system architecture 900 may include an onboard display device 970 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 920 may include and/or may be in communication with a routing controller 932 that generates a navigation route from a start position to a destination position for an autonomous vehicle. The routing controller 932 may access a map data store to identify possible routes and road segments that a vehicle can travel on to get from the start position to the destination position. The routing controller 932 may score the possible routes and identify a preferred route to reach the destination. For example, the routing controller 932 may generate a navigation route that minimizes Euclidean distance traveled or other cost function during the route, and may further access the traffic information and/or estimates that can affect an amount of time it will take to travel on a particular route. Depending on implementation, the routing controller 932 may generate one or more routes using various routing methods, such as Dijkstra's algorithm, Bellman-Ford algorithm, or other algorithms. The routing controller 932 may also use the traffic information to generate a navigation route that reflects expected conditions of the route (for example, current day of the week or current time of day, etc.), such that a route generated for travel during rush-hour may differ from a route generated for travel late at night. The routing controller 932 may also generate more than one navigation route to a destination and send more than one of these navigation routes to a user for selection by the user from among various possible routes.

In some scenarios, the vehicle on-board computing device 920 may determine perception information of the surrounding environment of the vehicle. Based on the sensor data provided by one or more sensors and location information that is obtained, the vehicle on-board computing device 920 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 920 may process sensor data (for example, lidar data, RADAR data, camera images, etc.) in order to identify objects and/or features in the environment of vehicle. The objects may include, but are not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 920 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle, pedestrian, bicycle, static object, or obstacle); and/or other state information.

The vehicle on-board computing device 920 may perform one or more prediction and/or forecasting operations. For example, the vehicle on-board computing device 920 may predict future locations, trajectories, and/or actions of one or more objects. For example, the vehicle on-board computing device 920 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 920 may predict whether the object will likely move straight forward or make a turn. If the perception data indicates that the intersection has no traffic light, the vehicle on-board computing device 920 may also predict whether the vehicle may have to fully stop prior to entering the intersection.

In those or other scenarios, the vehicle on-board computing device 920 may determine a motion plan for the vehicle. For example, the vehicle on-board computing device 920 may determine a motion plan for the vehicle based on the perception data and/or the prediction data. Specifically, given predictions about the future locations of proximate objects and other perception data, the vehicle on-board computing device 920 can determine a motion plan for the vehicle that best navigates the vehicle relative to the objects at their future locations.

In those or other scenarios, the vehicle on-board computing device 920 may receive predictions and make a decision regarding how to handle objects and/or actors in the environment of the vehicle. For example, for a particular actor (for example, a vehicle with a given speed, direction, turning angle, etc.), the vehicle on-board computing device 920 decides whether to overtake, yield, stop, and/or pass based on, for example, traffic conditions, map data, state of the autonomous vehicle, etc. Furthermore, the vehicle on-board computing device 920 also plans a path for the vehicle to travel on a given route, as well as driving parameters (for example, distance, speed, and/or turning angle). That is, for a given object, the vehicle on-board computing device 920 decides what to do with the object and determines how to do it. For example, for a given object, the vehicle on-board computing device 920 may decide to pass the object and may determine whether to pass on the left side or right side of the object (including motion parameters such as speed). The vehicle on-board computing device 920 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 920 may execute one or more control instructions to perform a cautious maneuver (for example, mildly slow down, accelerate, change lane, or swerve). In contrast, if the collision cannot be avoided, then the vehicle on-board computing device 920 may execute one or more control instructions for execution of an emergency maneuver (for example, brake and/or change direction of travel).

As discussed above, planning and control data regarding the movement of the vehicle is generated for execution. The vehicle on-board computing device 920 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 10:
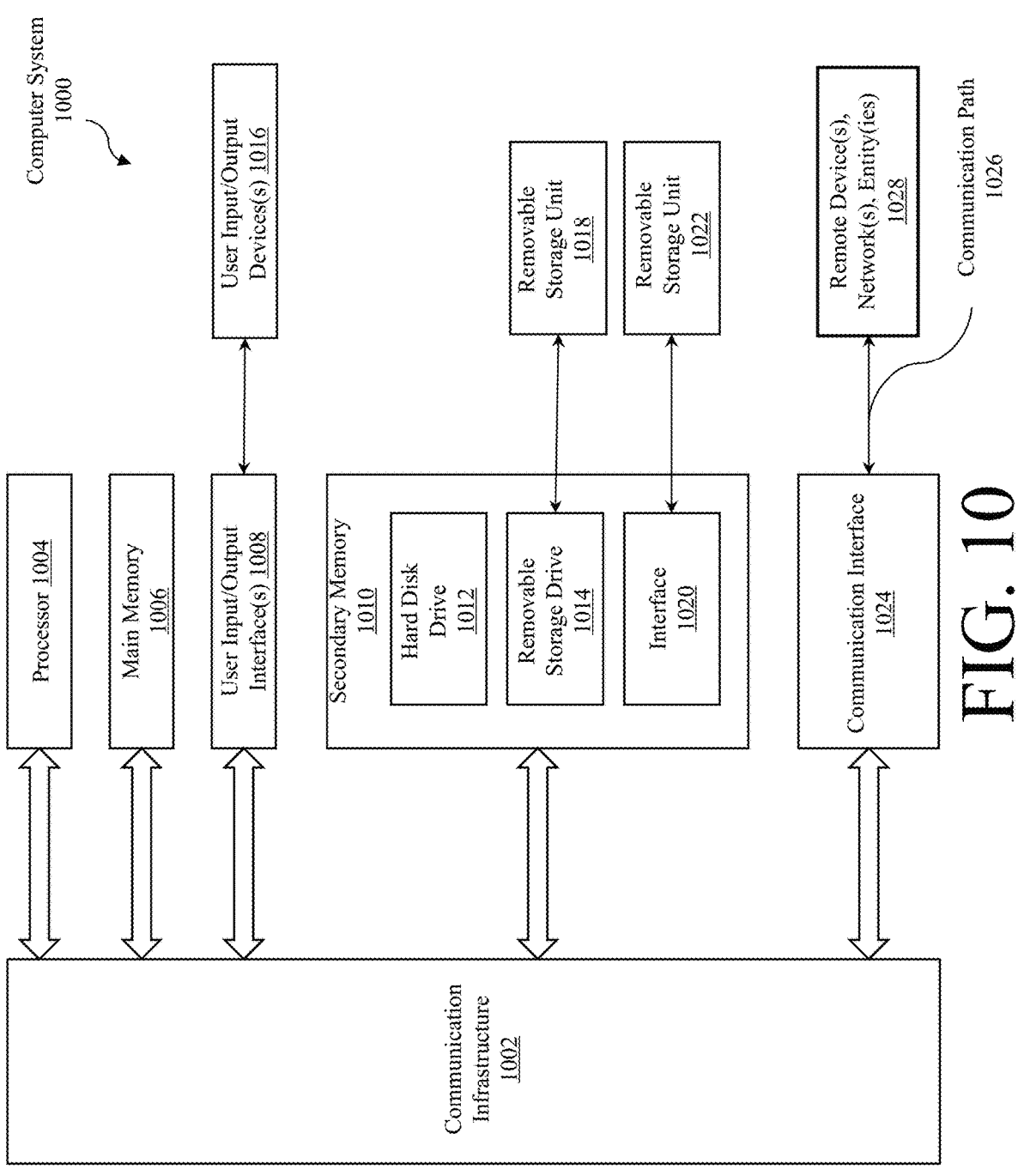
FIG. 10 provides an illustration of a computer system.

The present solution can be implemented, for example, using one or more computer systems, such as computer system 1000 shown in FIG. 10. Computer system 1000 can be any computer capable of performing the functions described herein. The on-board computing device 822 of FIG. 8, computing device 810 of FIG. 8, robotic device(s) 852 of FIG. 8, mobile communication device(s) 856 of FIG. 8, and/or the vehicle on-board computing device 920 of FIG. 9 may be the same as or similar to computing system 1000. As such, the discussion of computing system 1000 is sufficient for understanding the devices 810, 822, 852, 856 and 920 of FIGS. 8-9.

Computing system 1000 may include more or less components than those shown in FIG. 10. However, the components shown are sufficient to disclose an illustrative solution implementing the present solution. The hardware architecture of FIG. 10 represents one implementation of a representative computing system configured to operate a vehicle, as described herein. As such, the computing system 1000 of FIG. 10 implements at least a portion of the method(s) described herein.

Some or all components of the computing system 1000 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 1000 includes one or more processors (also called central processing units, or CPUs), such as a processor 1004. Processor 1004 is connected to a communication infrastructure or bus 1002. One or more processors 1004 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1016, such as monitors, keyboards, pointing devices, etc., that communicate with communication infrastructure 1002 through user input/output interface(s) 1008. Computer system 1000 further includes a main or primary memory 1006, such as random access memory (RAM).

Main memory 1006 may include one or more levels of cache. Main memory 1006 has stored therein control logic (i.e., computer software) and/or data.

One or more secondary storage devices or memories 1010 may be provided with computer system 1000. Secondary memory 1010 may include, for example, a hard disk drive 1012 and/or a removable storage device or drive 1014. Removable storage drive 1014 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 1014 reads from and/or writes to removable storage unit 1014 in a well-known manner.

In some scenarios, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In some scenarios, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 1000, main memory 1006, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 10. In particular, the present solution can operate with software, hardware, and/or operating system implementations other than those described herein.

Figure 11:
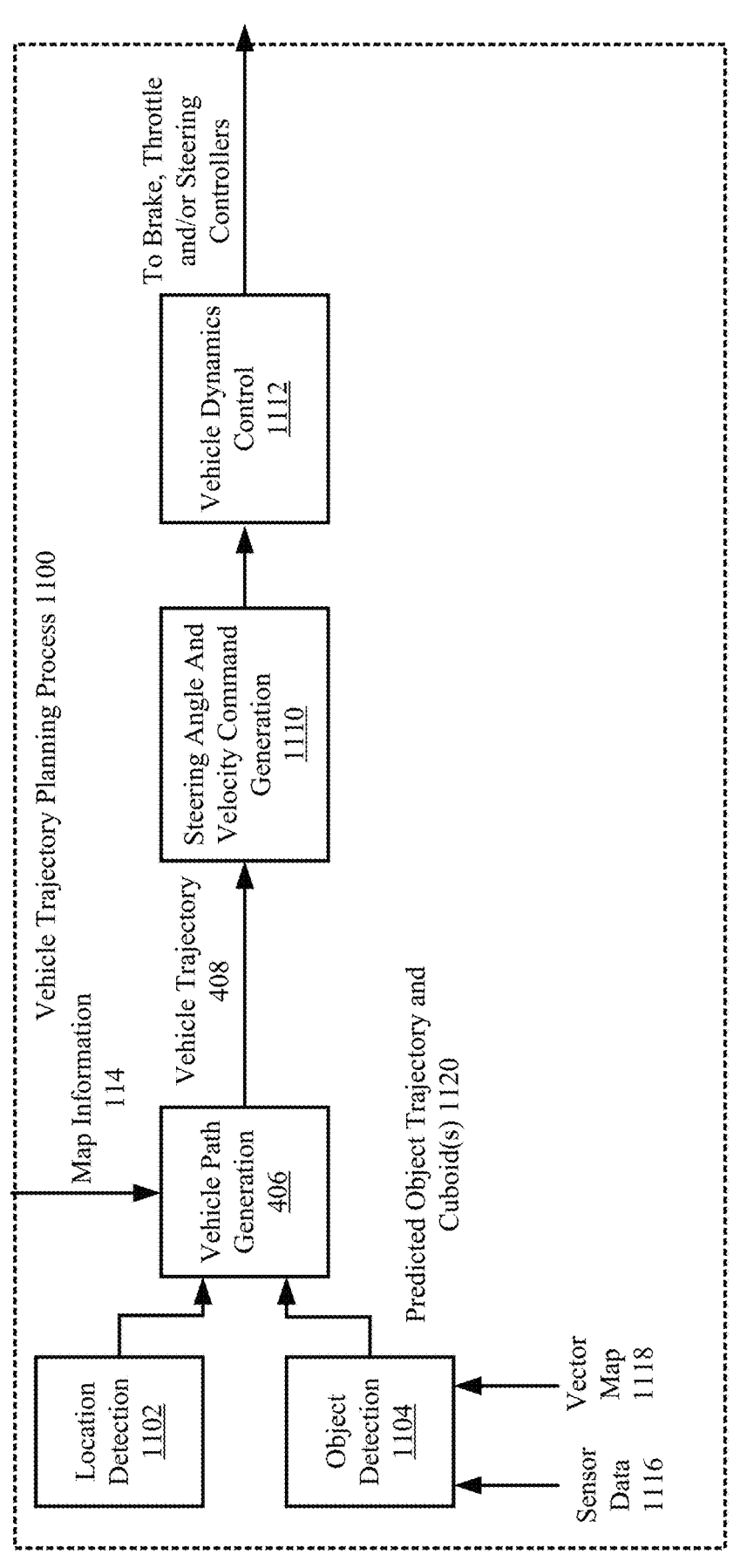
FIG. 11 provides a block diagram of an illustrative vehicle trajectory planning process.

FIG. 11 provides a block diagram that is useful for understanding how motion or movement of an AV is achieved in accordance with the present solution. All of the operations performed in blocks 1102-1112 can be performed by the on-board computing device (for example, on-board computing device 822 of FIGS. 8 and/or 920 of FIG. 9) of a vehicle (for example, AV 802 of FIG. 8).

In block 1102, a location of the AV (for example, AV 802 of FIG. 8) is detected. This detection can be made based on sensor data output from a location sensor (for example, location sensor 960 of FIG. 9) of the AV. This sensor data can include, but is not limited to, GPS data. The detected location of the AV is then passed to block 1106.

In block 1104, an object (for example, vehicle 803 of FIG. 8) is detected within proximity of the AV (for example, <100+ meters). This detection is made based on sensor data output from a camera (for example, camera 962 of FIG. 9) of the AV and/or a lidar system (for example, lidar system 964 of FIG. 9) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 1104 for the object. The object's trajectory is predicted in block 1104 based on the object's class, cuboid geometry(ies), cuboid heading(s) and/or contents of a map 1118 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 1118 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1120 specifying the object's predicted trajectory, the cuboid geometry(ies)/heading(s) is provided to block 1106. In some scenarios, a classification of the object is also passed to block 1106. In block 1106, a vehicle trajectory is generated using the information from blocks 1102 and 1104. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1120 can be determined based on the location information from block 1102, the object detection information from block 1104, and/or map information 1114 (which is pre-stored in a data store of the vehicle). The map information 1114 may include, but is not limited to, all or a portion of road map(s) 860 of FIG. 8. The vehicle trajectory 1120 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1120 is then provided to block 1108.

In block 1110, a steering angle and velocity command is generated based on the vehicle trajectory 1120. The steering angle and velocity command are provided to block 1110 for vehicle dynamics control, i.e., the steering angle and velocity command causes the AV to follow the vehicle trajectory 1108.

Figure 12A:
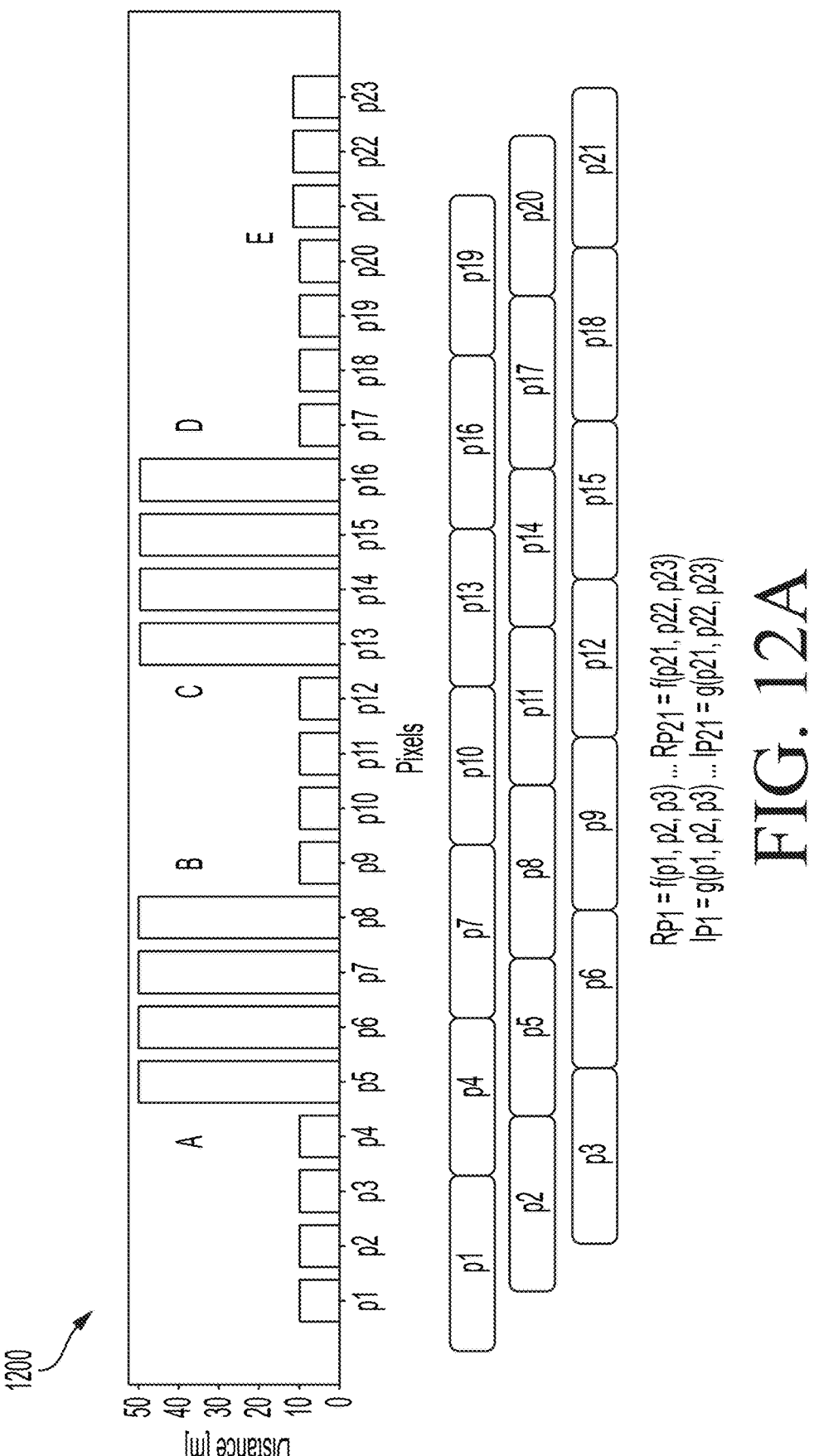
FIGS. 12A-12C (collectively referred to as FIG. 12) provide graphs showing a relationship between true distance and reflectivity of objects in the field of view of pixels, and a relationship between an estimated distance and received intensity of super pixels.
Figure 12B:
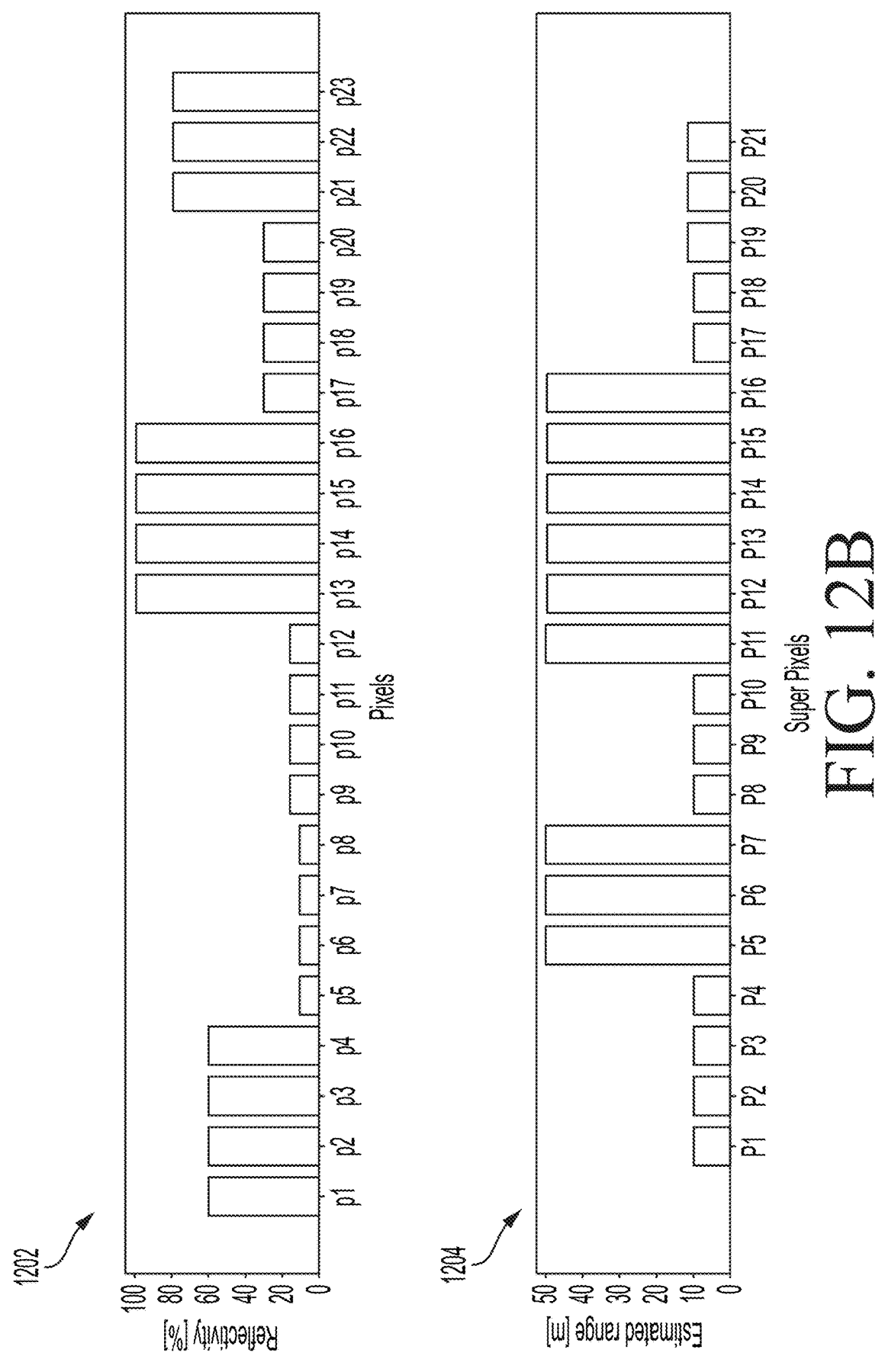
Figure 12C:
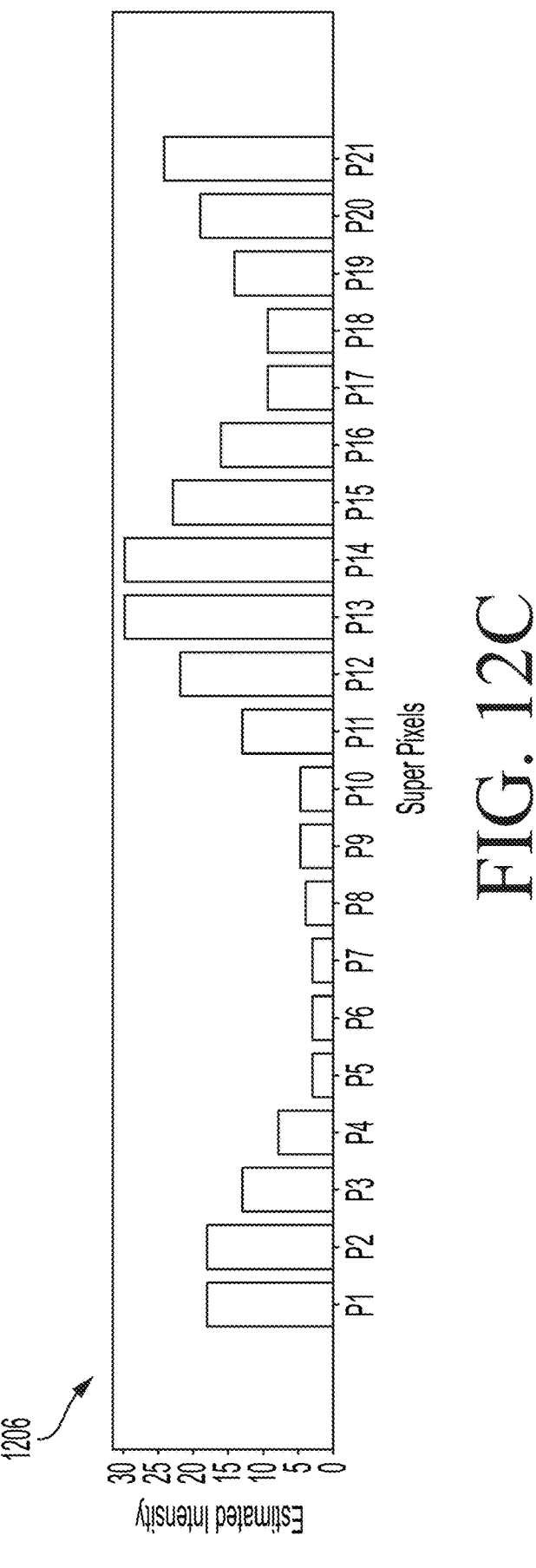

FIG. 12 provides graphs that are useful for further understanding implementations of the present solution. The top two graphs 1200, 1202 show the relationship between the true distance and reflectivity of objects in the field of view of pixels p1, . . . , p23. The bottom two graphs 1204, 1206 show the relationship between the estimated distance and received intensity by super pixels P1, . . . , P21. In the field of view of those pixels, objects at distances 10, 50, 10, 50, 10 and 10.5 m respectively have reflectivities 60%, 10%, 15%, 10%, 30%, and 80%.

Super pixel P1 measurements (such as distance and intensity) are obtained by processing the detections from pixels p1, p2 and p3 using functions f and g respectively. Similarly, super pixel P21 measurements are obtained by processing the detection from pixels p21, p22 and p23 using functions f and g.

Edge effects can be seen in the estimated range graph. The edges are marked by letters A, B, C, D and E. For edge A, the edge effect in estimated distance by super pixel P4 is supposed to report a range of 50 m but instead it reported a distance of 10 m. The reason is because the super pixel is processing detections from p4 (high reflectivity 60%), p5 (low reflectivity 10%) and p6 (low reflectivity 10%). Given the signal from p4 is strong due to the high reflectivity of the corresponding object, it dominates the overall combined signal from all the pixels leading to a distance observed by p4 which is 10 m.

For edge B, however, the edge effect did not occur because the relative reflectivity difference between objects at p8 and p9 is small. Therefore, as long as the majority of pixels cover the related objects, then the true distance will be reported. In this case, P7 is a result of processing p7, p8 and p9. Since p7 and p8 are already observing the object at distance 50 m and p9 could not dominate the combined signal due to looking at objects with similar reflectivity.

Edge C shows a false distance reported by super pixel $P_{11}$ (which processed pixels p11, p12 and p13) due to the dominance of a strong signal returned from a high reflectivity object in the field of view of pixel p13. Similarly at edge D, a false distance is reported by super pixel P16 (which processed pixels p16, p17 and p18) due to the dominance of a strong signal returned from a high reflectivity object in the field of view of pixel p16.

Edge D, due the relatively large change in reflectivity, P19 reported the distance of the high reflectivity object at pixels p21, p22, and p23 (at 10.5) instead of 10 m.

To resolve these edge effects, the dilation process is executed. The dilation process looks for those edge transitions (adjacent pixels with relatively high difference in range). With this rule, assuming a distance threshold of 1 m, the edges A, B, C and D are detected while edge E is missed. A user can choose the threshold based on the distance accuracy of the system. Too low threshold may cause the detection of distance variation due to the intrinsic noisy nature of the measurement process itself rather than the true distance change in the scene.

Following with the example of picking a threshold of 1 m. Edge A, B, C and D are considered for dilation processing. An examination is performed of the difference in estimated intensity around that edge. Then, operations are performed to dilate the object that corresponds to the low intensity side if the difference in intensity is above a certain threshold (2 photon).

Below are the edges and the corresponding difference in intensities observed by the super pixels are those edges:

A: 5 (difference in intensities between P4 and P5),
B: 1 (difference in intensities between P7 and P8),
C: 8 (difference in intensities between P10 and P11),
D: 8 (difference in intensities between P16 and P17)

Given the intensity difference in B is lower than the threshold (2 photon), it is not considered for dilation process. For edge A, the intensity is lower at P5, hence, its distance is used for dilation to P4. In edge C, P10 distance is used since its intensity is lower to dilate the object and use that distance for super pixel P11. In edge D, P17 distance is used since its intensity is lower to dilate the object and use that distance for super pixel P16.

Similar to the distance threshold used for detected edge transition, the threshold of intensity difference is determined based on intensity estimation accuracy and intrinsic noise of the lidar system.

The erosion process is executed in a similar manner. The main difference is that when processing the detected edges, the points that correspond to the high intensity values are deleted/or replaced. In the case of replacement, a possible candidate for replacement is the dilated point added during the dilation process. If the system is reporting only one single return for each super pixel, then performing the erosion process is unnecessary and performing the dilation process is sufficient.

In view of the forgoing discussion, the present solution generally concerns implementing systems and methods for operating a lidar system. The methods involve performing the following operations by a processor or computing device: causing each of a plurality of photodetectors to measure an intensity of a light signal reflected off an object external to the lidar system; receiving result values from the photodetectors that indicate measured reflected intensities of the light signal; performing convolutional algorithm(s) to combine different sets of the result values to produce a plurality of feature values; generating depth image(s) each comprising a plurality of super pixels having values respectively set to the respective feature values; and/or causing the at least one depth map to be used to control operations of a vehicle. The convolutional algorithm(s) may be (i) configured to combine non-overlapping and/or overlapping sets of the result values and/or (ii) implemented by even and odd sized convolutional filters or kernels with half-pixel strides.

In some scenarios, the methods also comprise: selecting the convolutional algorithm(s) from a plurality of convolutional algorithms based on a time of day, a location of the lidar system, and/or at least one condition of an environment in which the lidar system is being used. The condition of the environment can include, but is not limited to, amount of humidity or moisture, weather conditions (for example, raining, cloudy, foggy, etc.), a temperature, a distance visibility, a population density, and/or a building density. Additionally or alternatively, a size and/or a stride for a convolutional filter or kernel implementing the convolutional algorithm(s) is(are) selected based on the time of day, the location of the lidar system, and the condition of an environment in which the lidar system is being used.

In those or other scenarios, the methods comprise performing post processing operations to correct an edge effect of the depth image(s). The post processing operations can include: identifying first super pixels of the at least one depth image that are associated with estimated intensity values or noise floor values below a pre-defined value; and increasing the feature values of the first super pixels which were identified. The feature values of the first super pixels may be increased using a convolutional filter or kernel with a size that is inversely proportional to a respective one of the estimated intensity values.

The post processing operations may also comprise: identifying second super pixels of the at least one depth image that are associated with estimated intensity values or noise floor values above a pre-defined value; and decreasing a confidence value associated with the super pixel or discarding the super pixel. Additionally or alternatively, the post processing operations comprise: identifying third super pixels of the at least one depth image that are associated with estimated intensity values or noise floor values above a pre-defined value; detecting whether a super pixel of the third super pixels is associated with one of said photodetectors which generated two or more measures of reflected intensity for the light signal during a certain period of time; swapping a first measured reflectivity value of a first return with a second measured reflectivity value of a second return for the super pixel; and computing a new feature value using the second measured reflectivity value.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The breadth and scope of this disclosure should not be limited by any of the above-described exemplary embodiments but should be defined only in accordance with the following claims and their equivalents.

What is claimed is:

1. A method for operating a lidar system, comprising:
performing operations by each of a plurality of photodetectors to facilitate measurements of an intensity of a light signal reflected off an object external to the lidar system;
receiving, by a processor, result values from the photodetectors that indicate measured reflected intensities of the light signal;
performing, by the processor, at least one convolutional algorithm to combine different sets of the result values to produce a plurality of feature values, wherein the different sets of the result values partially overlap with each other;
generating, by the processor, at least one depth image or point cloud comprising a plurality of super pixels having values respectively set to the feature values; and
performing, by the processor, post processing operations for correcting an edge effect of the at least one depth image, wherein the edge effect results from the performing of the at least one convolutional algorithm.

2. The method according to claim 1, wherein the at least one convolutional algorithm is (i) configured to combine non-overlapping or overlapping sets of the result values or (ii) implemented by even and odd sized convolutional computing kernels with half-pixel strides.

3. The method according to claim 1, further comprising selecting by the processor the at least one convolutional algorithm from a plurality of convolutional algorithms based on at least one of a time of day, a location of the lidar system, or at least one condition of an environment in which the lidar system is being used.

4. The method according to claim 1, further comprising selecting, by the processor, at least one of a size or a stride for a convolutional computing kernel implementing the at least one convolutional algorithm based on at least one of a time of day, a location of the lidar system, and at least one condition of an environment in which the lidar system is being used.

5. The method according to claim 1, wherein the post processing operations comprise:
identifying a transition region between adjacent super pixels where a difference in the feature values exceeds a distance threshold; and
adjusting the feature value of a target super pixel within the transition region based on a comparison of an estimated intensity value associated with the target super pixel against an intensity threshold.

6. The method according to claim 5, wherein the post processing operations comprise:
identifying super pixels of the at least one depth image that are associated with estimated intensity values or noise floor values below a pre-defined value; and
increasing the feature values of the identified super pixels which were identified.

7. The method according to claim 6, wherein the feature values of the identified super pixels are increased using a convolutional computing kernel with a size that is inversely proportional to a respective one of the estimated intensity values.

8. The method according to claim 5, wherein the post processing operations comprise:
identifying super pixels of the at least one depth image that are associated with estimated intensity values or noise floor values above a pre-defined value; and
decreasing a confidence value associated with the identified super pixels or discarding the identified super pixels.

9. The method according to claim 5, wherein the post processing operations comprise:
identifying super pixels of the at least one depth image that are associated with estimated intensity values or noise floor values above a pre-defined value;
detecting whether a super pixel of the identified super pixels is associated with one of said photodetectors which generated two or more measures of reflected intensity for the light signal during a certain period of time;
swapping a first measured reflectivity value of a first return with a second measured reflectivity value of a second return for the super pixel; and
computing a new feature value using the second measured reflectivity value.

10. A system, comprising:
a processor;
a non-transitory computer-readable storage medium comprising programming instructions that are configured to cause the processor to implement a method for operating a lidar system, wherein the programming instructions comprise instructions to:
cause each of a plurality of photodetectors to facilitate measurements of an intensity of a light signal reflected off an object external to the lidar system;
receive result values from the plurality of photodetectors that indicate measured reflected intensities of the light signal;
perform at least one convolutional algorithm to combine different sets of the result values to produce a plurality of feature values, wherein the different sets of the result values partially overlap with each other;
generate at least one depth image or point cloud comprising a plurality of super pixels having values respectively set to the feature values; and perform post processing operations for correcting an edge effect of the at least one depth image, wherein the edge effect results from the performing of the at least one convolutional algorithm.

11. The system according to claim 10, wherein the at least one convolutional algorithm is (i) configured to combine non-overlapping or overlapping sets of the result values or (ii) implemented by even and odd sized convolutional computing kernels with half-pixel strides.

12. The system according to claim 10, wherein the programming instructions further comprise instructions to select the at least one convolutional algorithm from a plurality of convolutional algorithms based on at least one of a time of day, a location of the lidar system, or at least one condition of an environment in which the lidar system is being used.

13. The system according to claim 10, wherein the programming instructions further comprise instructions to select at least one of a size or a stride for a convolutional computing kernel implementing the at least one convolutional algorithm based on at least one of a time of day, a location of the lidar system, and at least one condition of an environment in which the lidar system is being used.

14. The system according to claim 10, wherein the post processing operations comprise:

identifying a transition region between adjacent super pixels where a difference in the feature values exceeds a distance threshold; and adjusting the feature value of a target super pixel within the transition region based on a comparison of an estimated intensity value associated with the target super pixel against an intensity threshold.

15. The system according to claim 14, wherein the post processing operations comprise:

identifying super pixels of the at least one depth image that are associated with estimated intensity values or noise floor values below a pre-defined value; and increasing the feature values of the identified super pixels which were identified.

16. The system according to claim 15, wherein the feature values of the identified super pixels are increased using a convolutional computing kernel with a size that is inversely proportional to a respective one of the estimated intensity values.

17. The system according to claim 14, wherein the post processing operations comprise:

identifying super pixels of the at least one depth image that are associated with estimated intensity values or noise floor values above a pre-defined value; and decreasing a confidence value associated with the identified super pixels or discarding the identified super pixels.

18. A non-transitory computer-readable medium that stores instructions that are configured to, when executed by at least one computing device, cause the at least one computing device to perform operations comprising:

causing a plurality of photodetectors to facilitate measurements of an intensity of a light signal reflected off an object external to a lidar system;

receiving result values from the photodetectors that indicate measured reflected intensities of the light signal;

performing at least one convolutional algorithm to combine different sets of the result values to produce a plurality of feature values, wherein the different sets of the result values partially overlap with each other;

generating at least one depth image or point cloud comprising a plurality of super pixels having values respectively set to the feature values; and perform post processing operations for correcting an edge effect of the at least one depth image, wherein the edge effect results from the performing of the at least one convolutional algorithm.

19. The non-transitory computer-readable medium according to claim 18, wherein the at least one convolutional algorithm is (i) configured to combine non-overlapping or overlapping sets of the result values or (ii) implemented by even and odd sized convolutional computing kernels with half-pixel strides.

20. The non-transitory computer-readable medium according to claim 18, wherein the at least one computing device to further caused to select the at least one convolutional algorithm from a plurality of convolutional algorithms based on at least one of a time of day, a location of the lidar system, or at least one condition of an environment in which the lidar system is being used.

* * * * *